(12) United States Patent
Bhat et al.

(10) Patent No.: US 11,853,413 B2
(45) Date of Patent: Dec. 26, 2023

(54) COMPUTATION DEVICE WITH INCREASED RESISTANCE AGAINST ADDRESS PROBING

(71) Applicant: KONINKLIJKE PHILIPS N.V., Eindhoven (NL)

(72) Inventors: Koustubha Bhat, Eindhoven (NL); Hendrik Jaap Bos, Eindhoven (NL); Cristiano Giuffrida, Eindhoven (NL); Erik van der Kouwe, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 235 days.

(21) Appl. No.: 17/299,813

(22) PCT Filed: Dec. 2, 2019

(86) PCT No.: PCT/EP2019/083235
§ 371 (c)(1),
(2) Date: Jun. 4, 2021

(87) PCT Pub. No.: WO2020/114937
PCT Pub. Date: Jun. 11, 2020

(65) Prior Publication Data
US 2022/0027461 A1    Jan. 27, 2022

(30) Foreign Application Priority Data

Dec. 7, 2018 (EP) .................................. 18211144
Dec. 11, 2018 (EP) .................................. 18211711

(51) Int. Cl.
*G06F 21/54* (2013.01)
*G06F 12/14* (2006.01)
(Continued)

(52) U.S. Cl.
CPC .......... *G06F 21/54* (2013.01); *G06F 12/1433* (2013.01); *G06F 21/554* (2013.01); *G06F 21/572* (2013.01); *G06F 21/79* (2013.01)

(58) Field of Classification Search
CPC ..................................................... G06F 21/54
See application file for complete search history.

(56) References Cited

U.S. PATENT DOCUMENTS 7,730,322 B2 * 6/2010 Johnson .................. G06F 21/50
                                                      713/189
8,302,210 B2 * 10/2012 Myles ..................... G06F 21/54
                                                      719/331
(Continued)

OTHER PUBLICATIONS

Chao Zhang, Tao Wei, Zhaofeng Chen, Lei Duan, Laszlo Szekeres, Stephen McCamant, Dawn Song, and Wei Zou. 2013. Practical control flow integrity and randomization for binary executables. 2013 IEEE Symposium on Security and Privacy.
(Continued)

*Primary Examiner* — Ponnoreay Pich

(57) ABSTRACT

Some embodiments are directed to a computing device (100) configured for execution of a computer program protected against address probing. The device is configured to run at least one anomaly detector (140) for detecting an address probing on the computer program, and to selectively replace an originating computer program code part with a replacement computer program code part wherein an address probing countermeasure is added.

20 Claims, 10 Drawing Sheets

(51) Int. Cl.
    *G06F 21/55*     (2013.01)
    *G06F 21/57*     (2013.01)
    *G06F 21/79*     (2013.01)

(56) References Cited

U.S. PATENT DOCUMENTS

| | | | | |
|---|---|---|---|---|
| 8,601,584 | B1* | 12/2013 | Lu | G06F 21/54 |
| | | | | 719/313 |
| 9,754,112 | B1* | 9/2017 | Moritz | G06F 21/54 |
| 10,642,978 | B2* | 5/2020 | Teal | G06F 21/52 |
| 2006/0242700 | A1* | 10/2006 | Fischer | G06F 11/0706 |
| | | | | 712/E9.082 |
| 2008/0155692 | A1* | 6/2008 | Abrams | G06F 21/62 |
| | | | | 726/22 |
| 2016/0026791 | A1* | 1/2016 | Melski | G06F 21/54 |
| | | | | 726/25 |
| 2016/0092674 | A1 | 3/2016 | Hughhes | |
| 2017/0091447 | A1 | 3/2017 | Boehm et al. | |
| 2017/0213039 | A1 | 7/2017 | Werner et al. | |
| 2018/0046585 | A1 | 2/2018 | Okhravi et al. | |

OTHER PUBLICATIONS

Mingwei Zhang and R Sekar. 2013. Control flow integrity for COTS binaries. In USENIX Security.
International Search Report and Written Opinion from PCT/EP2019/093235 dated Jun. 11, 2020.

* cited by examiner

COMPUTATION DEVICE WITH INCREASED RESISTANCE AGAINST ADDRESS PROBING

CROSS-REFERENCE TO PRIOR APPLICATIONS

This application is the U.S. National Phase application under 35 U.S.C. § 371 of International Application No. PCT/EP2019/083235, filed on Dec. 2, 2019, which claims the benefit of EP Patent Application No. EP 18211711.9, filed on Dec. 11, 2018 and EP Patent Application No. EP 18211144.3, filed on Dec. 7, 2018. These applications are hereby incorporated by reference herein.

FIELD OF THE INVENTION

The invention relates to a computing device, a compiler device, a computing method, a compiling method, a computer readable medium.

BACKGROUND OF THE INVENTION

Many modern defenses against code reuse rely on hiding sensitive data such as shadow stacks in a huge memory address space. While much more efficient than traditional integrity-based defenses, these solutions are vulnerable to probing attacks which quickly locate the hidden data and compromise security.

Today's memory corruption attacks routinely bypass defenses such as Data Execution Prevention (DEP) by means of reusing code that is already in the program [42]. To do so, attackers need knowledge of the locations of recognizable code snippets in the application's address space for diverting the program's control flow toward them.

Rigorous enforcement of software integrity measures throughout an application such as, bounds-checking on accesses to buffers and data structures in memory, control flow integrity checks that ensure application behavior remains within the program's intended control flow, thwarts such attacks but, at a steep cost in performance [9, 19, 37-39, 45, 48]. To illustrate, we can expect applications to incur approximately an average slowdown of at least 9% to enforce forward-edge Control Flow Integrity (CFI) [48] that protects calls to functions, then 3.5-10% for shadow stacks to protect backward-edges [18] (protecting returns from functions), further 4% to prevent information leakage and 19.6% to thwart data corruption attacks by restricting memory reads and writes in the application through Software Fault Isolation (SFI) [32, 50]. Combining multiple defenses to counter different classes of attacks incurs a non-trivial cumulative overhead.

An alternative to such solutions that enforce software integrity, is to make it difficult to locate code and data in the first place. Examples of this approach range from address space layout randomization (ASLR), to advanced defenses that hide sensitive information at random locations in a large address space [16, 33, 36]. For instance, Code Pointer Integrity [33] moves all sensitive data such as code pointers to a "safe" region at a hidden location in memory. As a defense, such information hiding is more efficient than integrity-based defenses [8]. In particular, randomization is almost 'free', as even a sophisticated defense against code reuse attacks such as Code Pointer Integrity (CPI) adds a modest 2.9% performance overhead.

Unfortunately, recent research demonstrates that attackers bypass even the most advanced information-hiding defenses [13, 14, 23, 25, 29, 41]. They show that, by repeatedly probing the address space, either directly or by means of side channels, it is possible to break the underlying randomization and reveal the sensitive data. With this, even a robust information-hiding based defense stands defeated.

Thus, to protect against modern attacks, developers face an awkward dilemma: should they employ software integrity measures that are strong but very expensive (perhaps prohibitively so), or defenses based on information hiding that are fast, but offer weak protection?

To break randomization, attackers make use of a number of derandomization primitives. Examples include crashing reads and jumps [13], their crash-less counterparts [23, 25], and employing allocation oracles [41] among others. Since one-shot leaks are rare in modern defenses, as the defenses move all sensitive information (e.g., code pointers) out of reach of the attacker, state-of-the-art derandomization primitives typically probe by repeatedly executing an operation (e.g., a memory read) to exhaust the entropy. As there is no shortage of primitives, it is tempting to think that information hiding is doomed and integrity solutions are the future.

U.S. Pat. No. 9,754,112B1 relates generally to characterizing, detecting and healing vulnerabilities in computer code. The example detection processes described in U.S. Pat. No. 9,754,112B1 may leverage Address Space Layout Randomization (ASLR), and may combine ASLR with more fine-grained techniques like altered caller-callee conventions as ASLR can be overcome by an attacker that is aware of the technique being present.

The following references are included by reference as background, and for the reasons elaborated upon herein:
 1. 2006. Proftpd CVE 2006-5815. https://www.exploit-db.com/exploits/2856/. (2006).
 2. 2014. BROP Nginx exploit. http://www.scs.stanford.edu/brop
 3. 2014. perf: Add infrastructure and support for Intel PT. https://lwn.net/Articles/609010/. (2014).
 4. 2015. Intel Processor Trace decoder library. https://github.com/01org/processor-trace (2015).
 5. 2016. Poking Holes. https://github.com/vusec/poking-holes. (2016).
 6. 2018. ApacheBench. (2018). http://httpd.apache.org/docs/2.4/programs/ab.html
 7. 2018. 'libdwarf' library. https://www.prevanders.net/dwarf.html. (2018).
 8. Martin Abadi, Mihai Budiu, Ulfar Erlingsson, and Jay Ligatti. 2005. Control-flow Integrity. In CCS.
 9. Martin Abadi, Mihai Budiu, Ulfar Erlingsson, and Jay Ligatti. Control-flow integrity principles, implementations, and applications. ACM Transactions on Information and System Security (TISSEC) 13, 1 (2009).
 10. Michael Backes, Thorsten Holz, Benjamin Kollenda, Philipp Koppe, Stefan Nurnberger, and Jannik Pewny. 2014. You can run but you can't read: Preventing disclosure exploits in executable code. In CCS.
 11. Michael Backes and Stefan Nurnberger. 2014. Oxymoron: Making fine-grained memory randomization practical by allowing code sharing. In USENIX Security.
 12. David Bigelow, Thomas Hobson, Robert Rudd, William Streilein, and Hamed Okhravi. 2015. Timely rerandomization for mitigating memory disclosures. In CCS.
 13. Andrea Bittau, Adam Belay, Ali Mashtizadeh, David Mazieres, and Dan Boneh. 2014. Hacking blind. In S&P.

14. Erik Bosman, Kaveh Razavi, Herbert Bos, and Cristiano Giuffrida. 2016. Dedup Est Machina: Memory Deduplication as an Advanced Exploitation Vector. In S&P.
15. Kjell Braden, Lucas Davi, Christopher Liebchen, Ahmad-Reza Sadeghi, Stephen Crane, Michael Franz, and Per Larsen. 2016. Leakage-Resilient Layout Randomization for Mobile Devices. In NDSS.
16. Xi Chen, Asia Slowinska, Dennis Andriesse, Herbert Bos, and Cristiano Giuffrida. 2015. StackArmor: Comprehensive Protection from Stack-based Memory Error Vulnerabilities for Binaries. In NDSS.
17. Stephen Crane, Christopher Liebchen, Andrei Homescu, Lucas Davi, Per Larsen, Ahmad-Reza Sadeghi, Stefan Brunthaler, and Michael Franz. 2015. Readactor: Practical code randomization resilient to memory disclosure. In Security and Privacy (SP), 2015 IEEE Symposium on. IEEE, 763-780.
18. Thurston H Y Dang, Petros Maniatis, and David Wagner. 2015. The performance cost of shadow stacks and stack canaries. In Proceedings of the 10th ACM Symposium on Information, Computer and Communications Security. ACM, 555-566.
19. Lucas Davi, Patrick Koeberl, and Ahmad-Reza Sadeghi. 2014. Hardware-assisted fine-grained control-flow integrity: Towards efficient protection of embedded systems against software exploitation. In ACM DAC.
20. Lucas Davi, Christopher Liebchen, Ahmad-Reza Sadeghi, Kevin Z Snow, and Fabian Monrose. 2015. Isomeron: Code Randomization Resilient to (Just-In-Time) Return-Oriented Programming In NDSS.
21. Gregory J Duck and Roland H C Yap. 2016. Heap bounds protection with low fat pointers. In ACM CC
22. Isaac Evans, Sam Fingeret, Julian Gonzalez, Ulziibayar Otgonbaatar, Tiffany Tang, Howard Shrobe, Stelios Sidiroglou-Douskos, Martin Rinard, and Hamed Okhravi. 2015. Missing the point(er): On the effectiveness of code pointer integrity. In S&P
23. Robert Gawlik, Benjamin Kollenda, Philipp Koppe, Behrad Garmany, and Thorsten Holz. 2016. Enabling Client-Side Crash-Resistance to Overcome Diversification and Information Hiding. In NDSS.
24. Enes Goktas, Elias Athanasopoulos, Herbert Bos, and Georgios Portokalidis. 2014. Out of control: Overcoming control-flow integrity. In S&P.
25. E Goktas, R Gawlik, B Kollenda, E Athanasopoulos, G Portokalidis, C Giuffrida, and H Bos. 2016. Undermining information hiding (and what to do about it). In USENIX Security.
26. Ben Gras, Kaveh Razavi, Erik Bosman, Herbert Bos, and Cristiano Giuffrida. ASLR on the line: Practical cache attacks on the MMU. NDSS (February 2017) (2017).
27. Hong Hu, Shweta Shinde, Sendroiu Adrian, Zheng Leong Chua, Prateek Saxena, and Zhenkai Liang. 2016. Data-oriented programming On the expressiveness of non-control data attacks. In Security and Privacy (SP), 2016 IEEE Symposium on. IEEE, 969-986.
28. Intel. Processor Tracing. https://software.intel.com/en-us/blogs/2013/09/18/processor-tracing
29. Yeongjin Jang, Sangho Lee, and Taesoo Kim. 2016. Breaking Kernel Address Space Layout Randomization with Intel TSX. In ACM CCS.
30. Andi Kleen. https://lwn.net/Articles/648154/.
31. Benjamin Kollenda, Enes Goktas, Tim Blazytko, Philipp Koppe, Robert Gawlik, Radhesh Krishnan Konoth, Cristiano Giuffrida, Herbert Bos, and Thorsten Holz. 2017. Towards Automated Discovery of Crash-Resistant Primitives in Binaries. In DSN.
32. Koen Koning, Xi Chen, Herbert Bos, Cristiano Giuffrida, and Elias Athanasopoulos. 2017. No Need to Hide: Protecting Safe Regions on Commodity Hardware. In Proceedings of the Twelfth European Conference on Computer Systems. ACM, 437-452.
33. Volodymyr Kuznetsov, Laszlo Szekeres, Mathias Payer, George Candea, R Sekar, and Dawn Song. 2014. Code-pointer integrity. In OSDI.
34. Volodymyr Kuznetsov, Laszlo Szekeres, Mathias Payer, George Candea, and Dawn Song. 2015. Poster: Getting the point(er): On the feasibility of attacks on code-pointer integrity. In S&P.
35. Chris Lattner and Vikram Adve. 2004. LLVM: A Compilation Framework for Lifelong Program Analysis & Transformation. In CGO.
36. Kangjie Lu, Chengyu Song, Byoungyoung Lee, Simon P Chung, Taesoo Kim, and Wenke Lee. 2015. ASLR-Guard: Stopping address space leakage for code reuse attacks. In ACM CCS.
37. Ali Jose Mashtizadeh, Andrea Bittau, David Mazieres, and Dan Boneh. 2015. Cryptographically enforced control flow integrity. In ACM CCS.
38. Vishwath Mohan, Per Larsen, Stefan Brunthaler, Kevin W Hamlen, and Michael Franz. 2015. Opaque Control-Flow Integrity. In NDSS.
39. Santosh Nagarakatte, Jianzhou Zhao, Milo M K Martin, and Steve Zdancewic. 2009. SoftBound: Highly compatible and complete spatial memory safety for C. PLDI.
40. Santosh Nagarakatte, Jianzhou Zhao, Milo M. K. Martin, and Steve Zdancewic. 2010. CETS: Compiler Enforced Temporal Safety for C. In ISMM.
41. Angelos Oikonomopoulos, Elias Athanasopoulos, Herbert Bos, and Cristiano Giuffrida. 2016. Poking holes in information hiding. In USENIX Security.
42. Marco Prandini and Marco Ramilli. Return-oriented programming IEEE Security & Privacy (2012).
43. Robert Rudd, Richard Skowyra, David Bigelow, Veer Dedhia, Thomas Hobson, Stephen Crane, Christopher Liebchen, Per Larsen, Lucas Davi, Michael Franz, et al. Address-Oblivious Code Reuse: On the Effectiveness of Leakage-Resilient Diversity. (2017).
44. Jeff Seibert, Hamed Okhravi, and Eric Soderstrom. 2014. Information leaks without memory disclosures: Remote side channel attacks on diversified code. In CCS.
45. Konstantin Serebryany, Derek Bruening, Alexander Potapenko, and Dmitriy Vyukov. 2012. AddressSanitizer: a fast address sanity checker. In USENIX ATC.
46. Kevin Z Snow, Fabian Monrose, Lucas Davi, Alexandra Dmitrienko, Christopher Liebchen, and Ahmad-Reza Sadeghi. 2013. Just-in-time code reuse: On the effectiveness of fine-grained address space layout randomization. In Security and Privacy (SP), 2013 IEEE Symposium on. IEEE, 574-588.
47. Adrian Tang, Simha Sethumadhavan, and Salvatore Stolfo. 2015. Heisenbyte: Thwarting memory disclosure attacks using destructive code reads. In Proceedings of the 22nd ACM SIGSAC Conference on Computer and Communications Security. ACM, 256-267.
48. Caroline Tice, Tom Roeder, Peter Collingbourne, Stephen Checkoway, Ulfar Erlingsson, Luis Lozano, and Geoff Pike. 2014. Enforcing forward-edge control-flow integrity in GCC & LLVM. In USENIX Security.

49. Victor van der Veen, Dennis Andriesse, Enes Goktas, Ben Gras, Lionel Sambuc, Asia Slowinska, Herbert Bos, and Cristiano Giuffrida. 2015. Practical Context-Sensitive CFI. In CCS.
50. Robert Wahbe, Steven Lucco, Thomas E Anderson, and Susan L Graham. 1993. Efficient software-based fault isolation. In SOSP.
51. Chao Zhang, Tao Wei, Zhaofeng Chen, Lei Duan, Laszlo Szekeres, Stephen McCamant, Dawn Song, and Wei Zou. 2013. Practical control flow integrity and randomization for binary executables. In S&P.
52. Mingwei Zhang and R Sekar. 2013. Control flow integrity for COTS binaries. In USENIX Security.

SUMMARY OF THE INVENTION

A computing device configured for execution of a computer program protected against address probing is provided. The computing device may comprise a memory and a processor. The memory may store computer program code and computer program data, the computer program code comprising multiple computer program code parts and is configured to operate upon the computer program data. Addresses of the computer program code and/or computer program data may have been randomized in an address space. The processor may be configured to execute the computer program code within said randomized address space, monitor the execution of the computer program code by running at least one anomaly detector for detecting an address probing on the computer program, upon detecting the address probing, locate the computer program code part from which the address probing originated, selectively replace said originating computer program code part with a replacement computer program code part wherein an address probing countermeasure is added.

Many researchers today believe that defenses based on randomization are doomed and more heavy-weight solutions are necessary. A computation device as above uses reactive defenses and brings together the best of both worlds and it transitions from inexpensive passive defenses to stronger but more expensive active defenses when under attack, incurring low overhead in the normal case, while approximating the security guarantees of powerful active defenses. Evaluation show that such a solution for generic Linux programs is effective at balancing performance and security.

An aspect of the invention is a compiler device for compiling a source code to obtain a computer program protected against address probing. For example, the compiler device may compile a source code to obtain computer program code parts and to obtain multiple replacement computer program code parts.

The computing device and the compiling device are electronic devices. For example, they may be a computer. For example, the computing device may be a server, a web server, file server, service provider, a set-top box, a smartphone, etc. The devices and methods described herein may be applied in a wide range of practical applications. Such practical applications include the protection of computer software against attacks. For example, such computer programs may include server applications, user applications, operating systems, drivers and the like.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a computing device, FIG. 2a schematically shows an example of an embodiment of a computing device, FIG. 2b schematically shows an example of an embodiment of a computing device, FIG. 2c schematically shows an example of an embodiment of a compiling device, FIG. 3 schematically shows an example of an embodiment of a computing device and schematically shows an example of an embodiment of a computing method, FIG. 4 schematically shows an example of an embodiment of a computing device, FIGS. 5a and 5b schematically show an example of an embodiment of replacing a computer program part.

Figure 1:
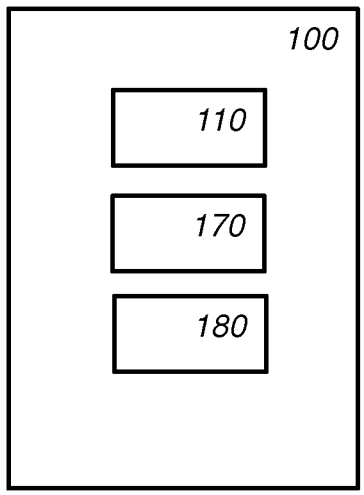

LIST OF REFERENCE NUMERALS 100, 101 a computing device
110 a memory
111 computer program code
115 computer program data
120 multiple computer program code parts
121-123 computer program code parts
125 multiple hardened computer program code parts 126-128 hardened computer program code parts
130 an execution unit
135 replacement data
140 an anomaly detector
150 a locator
152 a trace unit
160 a replacement unit
170 a processor
180 a communication interface
200 a computing device
201 probing
202 anomaly detecting
203 vulnerable spot identification
204 replacing the code part with a hardened code part
242-244 anomaly detecting units
220 a computer program
222 a computer program with identified vulnerable spot
224 a hardened computer program
250 a probe analysis unit
252 a runtime execution trace
254 LLVM IR
260 a hot-patching unit
262 a security hardened code cache
300 a computing device
301 user space
302 kernel space
310 information hiding based defense
320 a reactive defense server
330 a PT library
340 an operating system
345 PT recording
350 hardware
435, 435' replacement data
401-407 a code part
405' a replacement code part
500 a compiling device
512 a source code
510 a source input
522 a parser
524 a first compiling part
526 a second compiling part
528 an additional code part
530 a code output
1000 a computer readable medium
1010 a writable part
1020 a computer program
1100 a device
1110 a system bus
1120 a processor
1130 a memory
1140 a user interface
1150 a communication interface
1160 a storage
1161 an operating system
1162, 1163 instructions

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1 schematically shows an example of an embodiment of a computing device 100. Computing device 100 comprises a memory 110 and a processor 170. The memory comprises a computer program in the form of computer program code and computer program data. Processor 170 is configured to execute the computer program code. Executing the code may in part cause the processor to act upon the computer program data which is also stored in memory 110. Computing device 100 may comprise an optional communication interface 180.

The computer program has been protected by randomizing the addresses of the computer program code and/or computer program data in an address space. For example, conventional address randomizers may have been used for this purpose; for example, one may employ a randomized address for the location of the stack and/or for a shadow stack. For example, computing device 100 may use address space layout randomization (ASLR). For example, computing device 100 may use a more advanced defense that hides sensitive information at random locations in a large address space. For example, a randomization solution may be used such as described in any one of [16, 33, 36].

Computing device 100 may communicate with other electronic devices, e.g., over a computer network 180. The computer network may be an internet, an intranet, a LAN, a WLAN, etc. The computer network may be the Internet. For example, computing device 100 may be configured to request and receive a hardened version of a computer program code part when needed, e.g., from a server configured to provide the hardened version of the computer program code part.

The execution of the computing device 100 is implemented in a processor circuit, examples of which are shown herein. FIGS. 2a-5b are schematic illustrations that show, among others, functional units that may be functional units of the processor circuit. For example, FIG. 2a or 2b may be used as a blueprint of a possible functional organization of the processor circuit. The processor circuit is not shown separate from the units in these figures. For example, the functional units shown in FIG. 2a or 2b may be wholly or partially implemented in computer instructions that are stored at device 100, e.g., in an electronic memory of device 100, and are executable by a microprocessor of device 100. In hybrid embodiments, functional units are implemented partially in hardware, e.g., as coprocessors, e.g., code execution coprocessors, e.g., configured to store execution history, e.g., address from which code was executed recently, e.g., a trace, e.g., a branch trace. The processor circuit may comprise multiple sub-circuits.

Even though addresses are, at least in part, randomized on computing device 100, and attacker may attempt to, at least in part, recover the addresses of sensitive information. These may then be used in subsequent attacks on the computing device. For example, an attacker may interact with the computer program code, e.g., via an API of the computer program code, via the communication interface, and so on. Based on the response, e.g., based on unintended responses such as crashes, an attacker may be able to glean information about said randomized addresses. Accordingly, computing device 100 is protected against this according to an embodiment. Such embodiments are described herein.

Figure 2A:
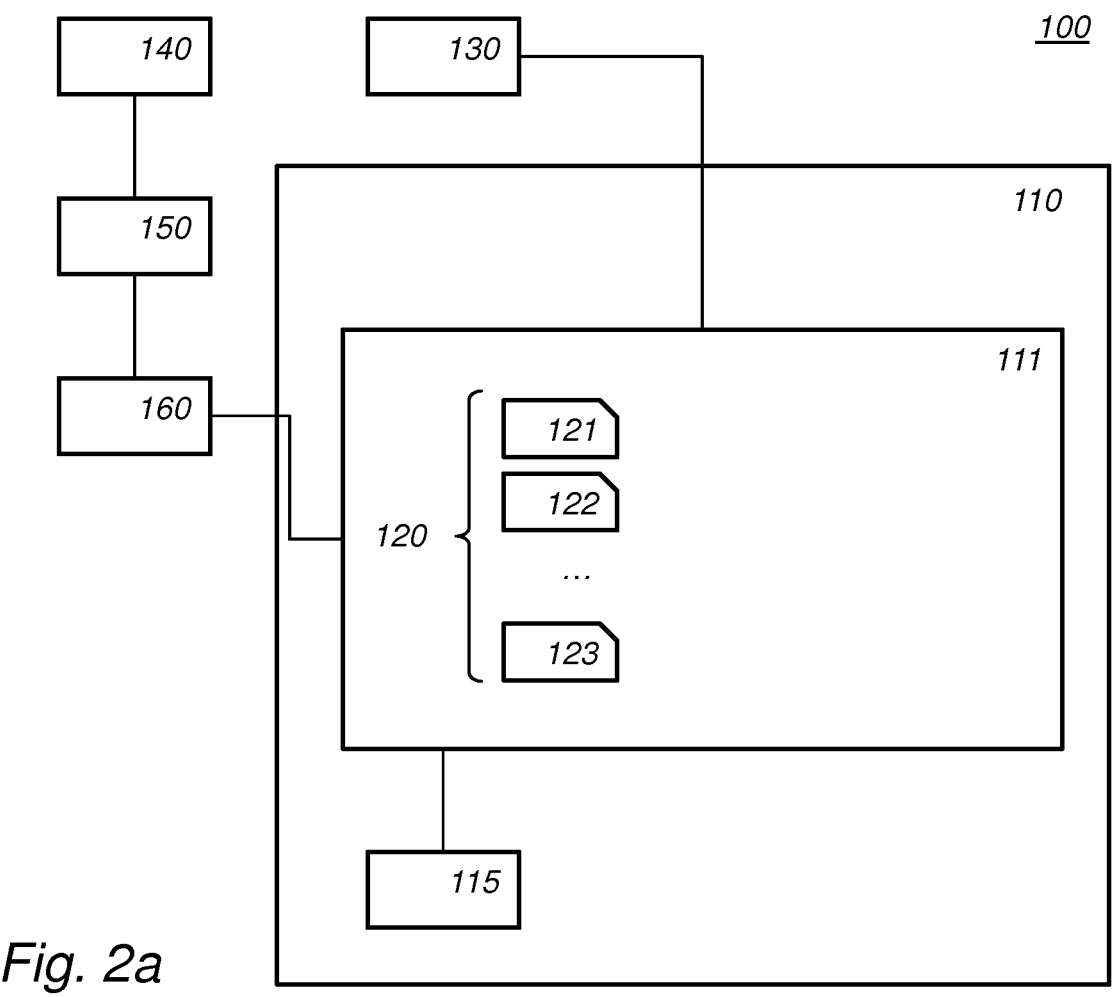

FIG. 2*a* schematically shows an example of an embodiment of a computing device 100. Computing device 100 comprises a memory 110 which stores a computer program. The computer program may comprise computer program code 111 and computer program data 115. The computer program code may comprise multiple computer program code parts 120. Shown in FIG. 2*a* are computer program code parts 121, 122 and 123. There may be more than 3 parts. For example, the computer program code parts may correspond to basic blocks and/or functions of the computer program code. For example, the computer program code parts may be basic blocks, extended basic blocks, functions, code units, etc.

Memory 110 may also store computer program data 115 on which the computer program code may act as it is executed by device 100. For example, the data may comprise constants, e.g., which may be part of computations that are implemented in the computer code. Data 115 may also comprise data which is provided by a user of device 100. For some, typically a-priori unknown, data the code parts may give an un-anticipated result, which is called an anomaly. For example, the code may crash, generate an error signal, unexpectedly terminate or perform behavior that deviates from specified behavior and which can be detected by the user, e.g., by an attacker. In modern attacks rely in large part on an attacker's capability to cause anomalies in the code which is under attack.

To prevent attacks on the code that are useful to an attacker, e.g., causing the code to perform functions that are not authorized, at least not for the attacker, e.g., privilege elevations, unauthorized decryptions, etc., the addresses of the computer program code and/or computer program data are randomized in an address space. This means that even if an attacker manages to find a successful attack for the computer program, sometimes called an exploit, the attack may not be portable. When the attack is tried on a different machine, the addresses on which the attack relies may be different because of the randomization. To counter this, attackers rely on specialized attacks. Before trying a full exploit, an attacker would iteratively perform multiple attacks to try to derive from the data on which to code acts and the unexpected output, an attacker may be able to derive information on the addresses of code or data. Such a small, preliminary attack configured to obtain the address of a code part and/or of a data part, in particular of a stack, is called an address probe. By executing multiple address probes, called address probing, an attacker may obtain enough information on the addresses to tailor the exploit to computation device 100.

In an embodiment, computer program 111 may be an application, e.g., an application running in user space. This is not necessary, in an embodiment, the computer program is an operating system, a driver, or the like. In addition to the computer program 111, memory 110 may store other data and computer program code, e.g., code representing an operating system, drivers, other applications, etc.

Computation device 100 may comprise an execution unit 130. Execution unit 130 is configured to cause the execution of computer program code parts 120 in the appropriate order. Execution unit 130 may be implemented in hardware, e.g., a part of a processor circuit, e.g., as part of conventional execution of a computer program by a processor circuit. However, execution unit 130 may in whole or in part be implemented in software as well. For example, execution unit 130 may be configured to access a list of addresses of the computer program code parts 120, select an address of a next computer program code part that is to be executed and cause execution of a processor circuit to continue at the selected address. A software implemented execution unit makes hot-patching easier. Execution unit 130 may be centralized or local.

As pointed out above some or all of the addresses of the computer program and/or computer program data are randomized. The randomization can be performed at compile time, but can also be done at runtime; for example, all or part of address randomization may be effected when compiling a computer program, e.g., computer program source code to obtain the computer program code and/or data. The latter has the advantage that address probing has to be performed within the same run, since subsequent runs have been randomized in a different manner. The former has the advantage that no new randomization is needed for each new start-up of the computer program code. Randomization may be performed by execution unit 130, or by a specific randomization unit (not separately shown). Many randomization solutions exist and may be used in an embodiment. For example, randomization may be used for the address of the stack, and/or for shadow stack. For example, ASLR may be used.

Execution unit 130 is configured to execute the computer program code in the randomized address space. This means that attack data on which the computer program is to act, and which was created to cause the computer program to perform an unauthorized function needs to be tailored to the randomized addresses. The address probing that an attacker could perform to achieve this has been made harder in embodiments described herein.

Computing device 100 may comprise an anomaly detector 140 configured to monitor the execution of the computer program code 111 by running at least one anomaly detector for detecting an address probing on the computer program. The anomaly detector may be a service of an execution environment provided by device 100 for the execution of computer program code. For example, anomaly detection may be done in an operation system, a runtime library, etc. A convenient way to extend a particular computer program with anomaly detection is to embed the anomaly detector 140 in the computer program code itself. For example, the anomaly detector may comprise a signal handler, e.g., which may be configured to register at start-up of the computer program. For example, the signal handler may detect an illegal reference to a memory, e.g., to unmapped memory or to memory for which the computer program code has no permissions, or, e.g., currently has no permission. The lack of permission may be that the memory is non-executable, while the program code tries to execute it.

The computer program source code and/or the anomaly detector source code, etc., may be written in a number of known computer programming languages, including, e.g., C, C++, C #, Java, etc. The computer program source code and/or the anomaly detector source code, etc., may also be written in machine language, e.g., assembly. Hybrids are also possible, e.g., part high-level source code and part low-level source code. The computer program code may be obtained by compiling and/or linking the source code. For example, computer program code and its computer program code parts may comprise computer executable instructions.

In an embodiment, the anomaly detector may comprise a static library which is linked with the computer program. For example, a signal handler may be linked to the computer code in this manner. For example, an anomaly detector may be compiled from source code independent from the compilation of the computer program.

The anomaly detector can be configured for a variety of anomalies that signal that the computer program code is being executed outside specified behavior. For example, anomaly detector 140 may comprise multiple sub-anomaly detectors. For example, the sub-anomaly detectors may be configured to detect one or more specialized anomalies, whereas anomaly detector 140 detects an anomaly if any of the multiple sub-anomaly detectors does.

For example, the anomaly detector may be configured for one or more or all of the following to detect an anomaly:
  detecting a read or write operation to an invalid address,
  intercepting a system call and inspecting a return value of the intercepted system call for one or more specific errors,
  detecting attempted execution from non-executable memory,
  detecting attempted execution of an illegal instruction,
  intercepting a system call arranged to allocate memory, inspecting an allocation size, and determining if the allocation size is above a threshold.

In an embodiment of the anomaly detector, any combination of the above is possible. Any one of the above countermeasures is options; for example, in an embodiment the anomaly detector may not inspect an allocation size. For example, such a risk may be considered too small, or the corresponding countermeasure may be considered cheap enough to install in any case. For example, in an embodiment an anomaly detector may be configured to detect only those anomalies that can be detected by signal handler, e.g., those anomalies that generate a fault signal, which may be received by the signal handler and processed as indicated herein. Such an anomaly detector has the advantage that no code instrumentation is needed to detect anomalies; such an anomaly detector could even be added to existing computer program code. A more advanced anomaly detector may use instrumentation, e.g., to intercept calls to and/or return values of function calls.

For example, in an embodiment the anomaly detector may be configured for detecting a read or write operation to an invalid address, detecting attempted execution from non-executable memory, and detecting attempted execution of an illegal instruction, e.g., a bad opcode. For example, the anomaly detector may comprise a signal handler that catches an unaligned access to memory (e.g., a unix sigbus signal), an access to an unmapped page (e.g., a unix sigsegv signal), an illegal instruction, e.g., a bad opcode (e.g., a unix sigill signal). It is not necessary that an anomaly detector catches all possible anomalies, although generally speaking catching more anomalies may improve security further. For example, an anomaly detector may be configured to detect only those anomalies for which hardened code is available.

The anomaly detector may include changes to normal code flow. For example, a system call may be intercepted and inspected. For example, one or more intercepted system calls may be verified for one or more specific errors. A particular system call which may be included is a system call arranged to allocate memory. If the system call would lead to allocating more than an allocation threshold, then the attempt may be signaled as an anomaly. Any particular detectable anomaly is optional, including the large-allocation detection.

A read or write operation to an invalid address may be a read or write to an unmapped address or to an address for which there is no permission. For example, detecting access to an unmapped virtual memory address may lead to a segmentation fault or a crash. For example, on unix-based systems, for example, the operating system sends a sigsegv signal. Using a sigsegv-handler the illegal read or write operation may be intercepted. It is an anomaly to read or write to an unmapped address. Such behavior is not specified for the computer program code since it leads to a crash of the software and/or to undefined behavior. A crash may be detected by an execution environment.

In an embodiment, some types of hardening may be incorporated in the normal code parts, e.g., as part of the baseline security, e.g., in addition to address randomization. For example, in an embodiment, system calls that allocate memory may be instrumented to restrict their maximum size, or may be otherwise be configured so that address probing from trying varying allocation sizes is not possible, e.g., by restricting the number of large allocations that can be made, e.g., the number that can be made in a time unit, e.g., per minute. The hardened code parts for replacement may, in addition have additional, countermeasures. For example, the hardened code parts may comprise a countermeasure for detecting a read or write operation to an invalid address, etc.

Computing device 100 may comprise a locator 150. Locator 150 may be configured to, upon detecting the address probing, locate the computer program code part from which the address probing originated. As pointed out, the computer program code may comprise multiple parts 120. For example, locator 150 may identify which computer program code part of the multiple parts caused the anomaly. For example, locator 150 may examine the stack and/or a shadow stack of the computer program.

In an embodiment, locator 150 is configured to retrieve the most recently executed address in a computer program code part. From most recently executed address locator 150 can then look-up the most recent computer code part.

For example, locator 150 may retrieve one or more addresses which have been executed most recently. The addresses may be obtained from an operating system, from an execution environment, or the like. The addresses may be retrieved from a hardware supported address history device, which keeps the most recently executed addresses; or at least part of the recently executed addresses, e.g., only the branches. The retrieved addresses include addresses of computer program code parts, but may contain additional addressees. For example, recently executed addresses may include addresses in a system library code or kernel code, etc. In that case, locator 150 may take the most recent address which is not in the system library code or kernel code.

In an embodiment, the computer code may be instrumented to provide information to the locator about recently executed code parts. For example, one or more or all code parts may be configured to send a signal when they are being executed. For example, a code part may be configured to write an identifier that is specific for the code part, say, in part of the memory. By retrieving the code part identifiers, or at least the most recent thereof, the locator may determine which code part was executed last. For example, the code identifiers may be written to a circular buffer, so that an amount of history is available, e.g., the last 10, 20, 100 execution, or more. The buffer may however also support just one single code part identifier. For example, each next code part may overwrite a code part identifier memory with its code part identifier. This may be used in a system in which an anomaly is detected, e.g., using a signal handler, etc., before a next code part is executed.

For example, a code part may be configured to write an identifier in a history, e.g., the identifier may identify the code part. The identifier may be a unique number, e.g., a random number. The identifier may be an addresses of the code part. The address may be used later for code replacement. For example, the identifier may be used to look up a replacement code part. The replacement code part may overwrite the code part. Alternatively, the normal code part may be overwritten with a code configured to relegate control to the hardened code part, etc.

In an embodiment, the locator is configured to determine which code part was executed last before the anomaly. Note that from a computer science point of view the ultimate cause of the anomaly may have happened much higher up in the source code. For example, if a code part dereferences a null pointer, an anomaly may result, e.g., in the form of an intercepted signal. It may be that the pointer was inadvertently set to zero much earlier in the history of the code's execution, however, for code hardening purposes it is sufficient if at least the code part that performs the actual dereference is identified.

Device 100 may comprise a replacement unit 160. Replacement unit 160 may be configured to selectively replace the computer program code part from which the anomaly, e.g., the address proving, originated, with a replacement computer program code part wherein an address probing countermeasure is added. In other words, it is not needed to replace the entire computer program code with a hardened version. Instead, only the offending part that caused an anomaly is replaced. For example, the replacing code may comprise the address probing countermeasures, e.g., countermeasures that avoid the anomaly or anomalies. After replacing with a hardened version, the attacker cannot continue to iterate the address probe to learn ever more about the program. Instead, the hardened code causes the address probe to fail. The countermeasure may additionally improve the user experience, e.g., by avoiding crashing, e.g., by failing gracefully, e.g., by jumping to a recovery routine instead of causing the anomaly. Such a graceful resolution of the anomaly routine is not necessary though; for example, the countermeasure may only stop the address probing from revealing information on the randomized addresses in the program.

In other words, after an anomaly has been detected and it has been determined which computer program code part caused the anomaly, that particular computer program code part may be replaced with a hardened version. The hardened version may be slower than the original code part, or use more resources; the impact of this is limited though since not the whole program code is replaced with a slower version, but only a part of it, e.g., only the offending computer program code part.

In an embodiment, the located computer program code part, e.g., the computer program code part from which the anomaly originated, may be replaced by hot-patching. Hot patching, also known as live patching or dynamic software updating, is the application of patches without shutting down the application. This has the advantage that the computer program can continue to run even though the computer program is henceforth protected. Hot-patching is not necessary; for example, in an embodiment one may patch the computer program while it is not running, e.g., as stored on a storage medium, e.g., as stored on a hard disk, or the like. This has the advantage that the next time the program is executed, the code part which is vulnerable to address probing is protected. In an embodiment, only hot-patching is used, or only cold patching, e.g., on a storage medium, or both.

For example, in an embodiment the computer code parts may correspond to source code parts, e.g., to functionally related units, to functions, to basic blocks, to extended basic blocks, etc. The hardened code part may be obtained by selecting the hardened code from a database. For example, the database may have a hardened version for each of the computer program code parts. The database may be a local database, e.g., at the computing device 100, e.g., in memory 110. A hardened code part may be obtained by downloading the hardened code part from an online server, e.g., from an online database. The hardened code part may be obtained by re-compiling the corresponding source code together with additional countermeasure source code. For example, a compiler may be configured to add address probing countermeasure to the source code part, and to compile the source code part with the added countermeasure thus obtaining the hardened computer program code part for replacing the computer program code part from which the anomaly originated. The compiling may be done locally, e.g., on the same device on which the computer program runs, or it may be don externally, e.g., on a different device, e.g., in the cloud. A received hardened code part may be protected cryptographically, e.g., with a digital signature. The signature may be checked by a replacement unit of the computing device.

In an embodiment, multiple replacement computer program code parts are included in the computer code to replace the multiple computer program code parts when needed. A replacement computer program code part is not used, e.g., not executed until the replacement computer program code replaces the originating computer program code part. This arrangement has the advantage that the code parts for executing and the code parts for replacing are available together, for immediate execution and/or replacement.

In an embodiment, replacing a code part may be done by overwriting a code part of multiple parts 120 with a hardened version. For example, it may be determined, e.g., during compile time how large the normal and the hardened versions of each part are. The normal version can then be extended with dummy data, e.g., nop instructions, to reserve space for the hardened version. Instead, the normal version can be replaced with a jump to a hardened version. After the hardened version finishes it may return control to the normal version, which then branches to the next part as normal; alternatively, the hardened part itself may branch to the next part. The unused executable code of then normal code may or may not be overwritten as desired, e.g., with dummy data. An alternative to drop-in replacements is a switchboard. This construction is described below.

In an embodiment, a list of branch addresses is maintained. The list may be indexed with branch identifiers. For each branch identifier a branch address is included. When a code part needs to branch, e.g., as identified with a branch identifier. The branch identifier may be an address, e.g., the normal code part address. The code part retrieves the branch address from the list, e.g., looking up the branch identifier. Initially, the branch addresses point to normal code parts. If a normal code part is replaced, the normal code part address is replaced in the list with the address of a hardened code part; this may be done by a replacement unit. Instead of a central list with address, two addresses may be kept in the code parts instead: an address for a branch to a normal code part and an address for a hardened code part. In that case, the list only needs to keep which address must be used. The latter reduces the size of the information to one bit per branch target, or even to one bit per branch target that points to a code part; the bit indicates which address is to be used. For branch targets within a code part, no special care is needed, and only one branch target address needs to be kept. Various other solutions can be used to implement the replacing, and in particular, the hot-patching of code.

In an embodiment, the hardened code part that replaces the originating code part is adapted to avoid the anomaly, or at least to avoid that a triggered anomaly reveals information on the randomized addresses. For example, one or more countermeasures may be included in the hardened computer code part. The countermeasure may be configured for one or more of the following:

verifying memory load and store operations in the replacement computer program code part, preventing control-flow diversion in the replacement computer program code part, verifying return addresses on the stack before diverting control flow in the replacement computer program code part, isolating faults in the replacement computer program code part, and limiting memory allocation operations in the replacement computer program code part.

For example, verifying memory load and store operations may be verified using, for example, Code Pointer Integrity (CPI) (including SafeStack) [33] or leakage-resistant variants such as Readactor [17] or TASR [12]. Many information leakage defenses add bounds checks on memory accesses. Examples include Softbound [39], CETS [40], Low-fat pointers [21], and Address sanitizer [45].

For example, preventing control-flow diversion in the replacement computer program code part may be done using Control Flow Integrity [8] (CFI), e.g., to check each indirect control-flow transfer to see if it adheres to the application's static control-flow graph.

For example, verifying return addresses on the stack before diverting control flow in the replacement computer program code part may be done, e.g., by saving the return address at function entry to a shadow stack, and verifying the return address before function exit.

For some countermeasures not only the offending computer code part may be replaced but also those code parts which may call the offending code parts, e.g., to ensure that a return address is placed on a shadow stack.

In an embodiment, a replacement code part includes countermeasures against each of the detected anomalies. This has the disadvantage that a code part burdened with countermeasures against problems to which it is not actually vulnerable. On the other hand, it has the advantage that the number of replacement parts is small, e.g., one. It is also possible to have multiple replacing code parts for one or more or all code parts. The multiple replacing code parts may be arranged with different countermeasures. This has the advantage that the replacing code parts are less over burdened with protective code, and may thus be smaller and/or faster. For example, the multiple replacing code parts may correspond to the multiple anomaly detectors; each anomaly detector detecting one or more anomalies and the corresponding replacing code parts comprise a countermeasure against said one or more anomalies.

For example, one set of multiple replacing code parts may have countermeasures against illegal memory accesses, e.g., sigsegv or sigbus, while others may have countermeasures against execution of illegal opcodes, e.g., sigill.

An illegitimate memory access may be to a valid or to an invalid address. What are illegitimate memory accesses may be determined by static analysis. An anomaly may also be caused by trying to execute non-executable memory.

There are several ways to implement a countermeasure. In an embodiment, a countermeasure may be configured to cause a computer program crash or restart, e.g., both for an illegitimate memory access to a mapped memory area and to an unmapped memory area. This should not inconvenience the user too much, since the anomaly will normally only occur with specially crafted input data. It can however severely inconvenience the attacker, especially if the crash or restart causes a re-randomization of the addresses.

After the replacement, it is convenient if the program continues to run. Recovery code may be added, or existing recovery code may be used to accommodate this. For example, in an embodiment, the computer program code comprises recovery code, the processor being configured to divert control flow to the recovery code after the selective replacement to resume operation of the computer program. For example, the recovery code may to a home screen or to the program state after a last successful transaction, etc. Countermeasures may also use recovery functions.

Figure 2B:
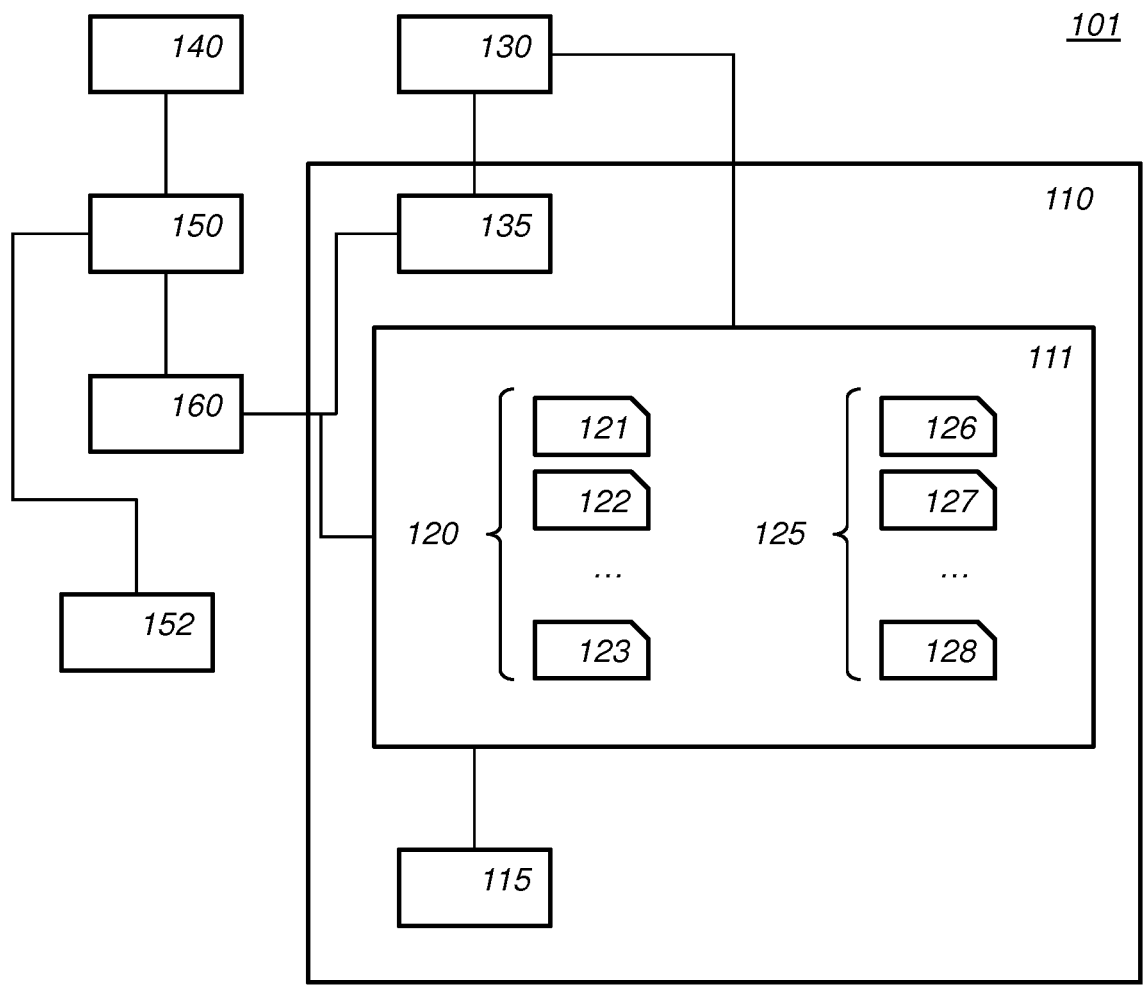

FIG. 2b schematically shows an example of an embodiment of a computing device 101. Computing device can be similar to computing device 100, except for a number of improvements.

For example, in an embodiment, computing device 100, e.g., locator 150 may be configured to locate the computer program code part from which the address probing originated from a trace of the computer program execution. For example, the trace may be maintained by a trace unit 152 configured to store a history, a trace, e.g., a branch trace, of one or more recently executed addresses of the computer program. The trace may show a number of recently executed addresses. For example, computing device 100, e.g., locator 150 may be configured to retrieving a trace of the computer program execution, the trace comprising addresses in the address space, determining the most recent address in the trace corresponding to the computer program code, determining the computer program code corresponding to the most recent address.

The trace addresses that are retrieved may be randomized addresses, and may be compared to the addresses used in the application. For example, this may use a look-up table, e.g., a table mapping addresses to computer code parts. For example, such a table may be created at run-time, e.g., at start-up, or at compile time. For example, in an embodiment a compiler is used that produces dwarf type debugging information. In an embodiment, dwarf version 4.0 was used, but other version work as well. For example, determining the computer program code corresponding to the most recent address may comprise determining a basic block and/or function of the computer program code corresponding to the most recent address.

For example, determining the most recent address in the trace corresponding to the computer program code, may comprises determining the most recent address not in a system library code or kernel code.

In addition, or instead, to a trace unit 152, computing unit 101 may comprise replacement data 135. For example, as shown in FIG. 2b, code 11a may comprise the computer program code parts 120 and also hardened computer program code parts 125. Shown are hardened computer program code parts 126, 127 and 128. For example, to each computer program code parts of multiple 120, there may correspond one or more hardened code parts. For example, hardened code part 126 may correspond to code part 121, hardened code part 127 may correspond to code part 122, etc. Thus, in an embodiment the code 111 contains at least two versions for each code parts: a normal version and one or more hardened versions. The hardened versions have the advantage that they are more secure. The normal versions have the advantage that they have less overhead, e.g., are smaller, faster, use fewer resources, etc. Initially replacement data 135 indicates that only the normal versions are to be used. For example, execution unit 130 may be configured to cooperate with replacement data 135. For example, when a next code part is to be executed, execution unit 130 looks up if the normal or the hardened version is to be executed. Such a manner of execution unit may be termed a switchboard, and replacement data 135, may be termed switchboard data. This solution for the replacing has the advantage that hot-patching is not complicated, only in replacement data 135 does it need to be indicated that a hardened version is to be used for one or more particular code parts. The next time that code part is needed, executor 130 will look up the code part to be used in replacement data 135 and continue to execute either the normal part in multiple 120 or the hardened part in 130. The replacement data 135 may also comprise practical information such as the address of the normal or hardened replacement code part.

It is not needed that each code part in multiple parts 120 has a hardened version. For example, a basic block in which a particular anomaly cannot occur, e.g., the normal code part may be the same as the hardened code part, does not need a hardened version. Thus, multiple 125 may be smaller than multiple 120. This should not cause a problem in practice, since normal code part in which an anomaly cannot occur would not be replaced.

A switch board solution works fine in which the replacement code parts are locally available. A switch board solution can also be used when the replacement code parts are dynamically obtained, e.g., downloaded or compiled when needed. In this case, the replacement code would indicate that a replacement code part is available and should be used.

For example, in an embodiment, the computer program code comprises replacement data 135 for switching from a computer program code part in which an anomaly was caused, to a replacement computer program code part. For example, the replacement data 135 may control for the multiple computer program code parts if the replacement computer program code part is to be used.

Deciding if control flow should be diverted to a hardened code part or to a normal code part may be done centrally, e.g., in an executor unit 130, or may be done in locally, e.g., in the code parts themselves. For example, if a branch is needed, the branch address may be looked up in the replacement data 135. Note that the location of the replacement data 135 itself may be randomized, just as, e.g., a stack or the like.

Figure 2C:
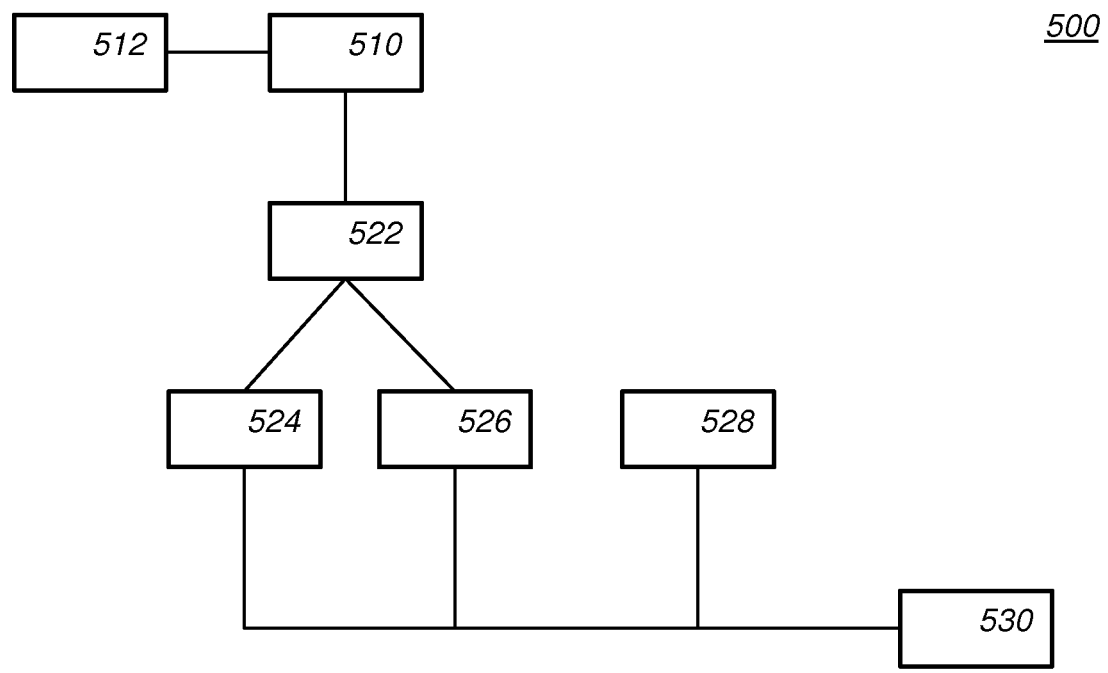

FIG. 2c schematically shows an example of an embodiment of a compiling device 500.

Compiling device 500 may comprise a source input for receiving a source code 512. For example, the source code may be C source code or the like. Source code input 512 may comprise a communication interface configured to receive the source code. For example, the source code input may comprise an API or an interface to a storage medium, such as a hard disk or memory.

Compiling device 500 may comprise a parser 522. Parser 522 may be configured to generate multiple computer program source parts. For example, parser 522 may identify in the source code, basic blocks, extended basic blocks, functions etc.

Compiling device 500 comprises a first compiling part 524 and a second compiling part 526 that are both configured to compile the computer program source parts identified by parser 522. For example, first compiling part 524 may compile the parts without or with only light countermeasures. For example, second compiling part 526 may compile the parts with added countermeasures. If support for randomization is added at compile time, this may be added both by first and second compiler part 524 and 526.

For example, first compiling part 524 may be configured to compile the source code to obtain computer program code, the computer program code comprising multiple computer program code parts corresponding to the multiple source code parts. For example, second compiling part 526 may be configured to compile the multiple source code parts with an added address probing countermeasure, thus obtaining multiple replacement computer program code parts.

First and second compiling parts 524 and 526 may use the same functionality of device 500, e.g., second compiling part 526 may add a countermeasure and then call first compiling part 524 to compile the source code together with the additional countermeasures. Compiling device 500 may comprise an additional code part 528 configured to include in the computer program code at least one anomaly detector and switching code. The at least one anomaly detector may be configured to detect an address probing on the computer program during execution. The switching code or replacement code may be configured to upon detecting the address probing, locate the computer program code part from which the address probing originated, and selectively replace said originating computer program code part with a corresponding replacement computer program code part.

For example, the anomaly detector(s) and replacement code may be as described herein. The anomaly detector(s) and replacement code may be added as part of compilation or as part of linking.

Compiling device 500 may comprise a code output 530 to output to compiled code. For example, the code output 530 may comprise a communication interface. For example, the code output 530 may store the compiled code on a storage medium, e.g., on a hard disk, in a memory, etc.

In the various embodiments of the computing device and compiling device, communication interfaces can be added as needed. For example, the interface may be a network interface to a local or wide area network, e.g., the Internet, a storage interface to an internal or external data storage, a keyboard, an application interface (API), etc.

The computing and/or compiling device may have a user interface, which may include well-known elements such as one or more buttons, a keyboard, display, touch screen, etc. The user interface may be arranged for accommodating user interaction for performing a computation and/or compiling action. For example, the computing device may be configured as a user application, e.g., a media player, a web browser, or an operating system or driver, etc. For example, the user may initiate media playing, web browsing, user operating system functions, driver functions and the like, e.g., though the user interface. Attacks that may be hidden in these interactions, e.g., a specially crafted media file, web page, and the like, may be detected by an anomaly detector and inoculated by replacing the code part that causes the anomaly with a hardened version.

Computing devices and compiling device may both comprise a storage, e.g., to store code parts, source code, code output and the like. The storage may be implemented as an electronic memory, say a flash memory, or magnetic memory, say hard disk or the like, or optical memory, e.g., a DVD. Multiple discrete memories may together make up a larger memory, e.g., a storage, memory 110, etc.

Typically, the computing devices and compiling device, e.g., device 100, 101, 500 each comprise a microprocessor which executes appropriate software stored at the devices; for example, that software may have been downloaded and/or stored in a corresponding memory, e.g., a volatile memory such as RAM or a non-volatile memory such as Flash. Alternatively, the devices may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc.

In an embodiment, the devices may comprise one or more circuits configured to implement the corresponding units described herein. The circuits may be a processor circuit and storage circuit, the processor circuit executing instructions represented electronically in the storage circuits. A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 7A:
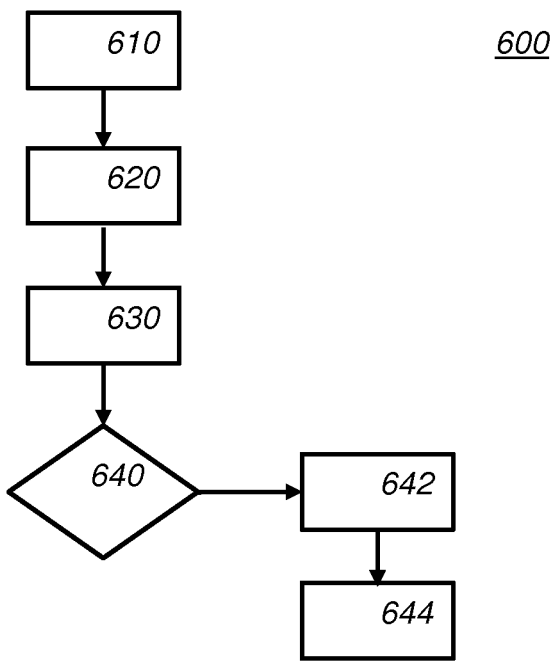

FIG. 7a schematically shows an example of an embodiment of a computing method 600. Computing method 600 comprises execution of a computer program protected against address probing. Method 600 comprises storing 610 computer program code 120 and computer program data 115. The computer program code comprises multiple computer program code parts and is configured to operate upon the computer program data. Addresses of the computer program code and/or computer program data having been randomized in an address space. Said randomization may be part of method 600, e.g., as part of a start-up phase of the computer program code.

executing 620 the computer program code within said randomized address space, monitoring 630 the execution of the computer program code by running at least one anomaly detector 140 for detecting an address probing on the computer program, upon detecting 640 the address probing, locating 642 the computer program code part from which the address probing originated, selectively replacing 644 said originating computer program code part with a replacement computer program code part wherein an address probing countermeasure is added.

Figure 7B:
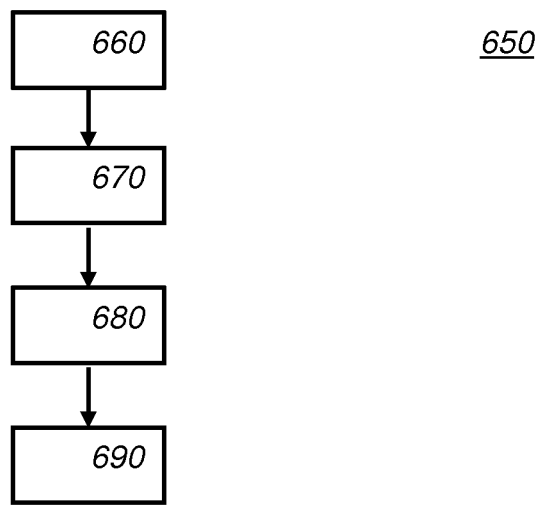

FIG. 7b schematically shows an example of an embodiment of a compiling method 650. Compiling method 650 is configured to compiling a source code to obtain a computer program protected against address probing. Compiling method 650 comprises compiling 660 the source code to obtain computer program code, the computer program code comprising multiple computer program code parts corresponding to multiple source code parts, the computer program code being arranged for execution in a randomized address space, compiling 670 the multiple source code parts with an added address probing countermeasure, thus obtaining multiple replacement computer program code parts, including 680 in the computer program code at least one anomaly detector configured for detecting an address probing on the computer program during execution, including 690 switching code in the computer program code, the switching code being configured to upon detecting the address probing, locate the computer program code part from which the address probing originated, and selectively replace said originating computer program code part with a corresponding replacement computer program code part.

Many different ways of executing the method are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. For example, steps 620 and 630, 660 and 670, 680 and 690, etc. may be executed, at least partially, in parallel. Moreover, a given step may not have finished completely before a next step is started.

Embodiments of the method may be executed using software, which comprises instructions for causing a processor system to perform method 600 and/or 650. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Below further enhancements, implementation details and/or further embodiments are described. In particular, a prototype implementation is described called ProbeGuard. ProbeGuard mitigates address probing attacks through reactive program transformations Many modern defenses against code reuse rely on hiding sensitive data such as shadow stacks in a large memory address space. While more efficient than traditional integrity-based defenses, these solutions are vulnerable to probing attacks which can locate the hidden data and compromise security. This has led researchers to question the value of information hiding in real-world software security.

Instead, embodiments show that such a limitation is not fundamental and that information hiding and integrity-based defenses are two extremes of a continuous spectrum of solutions. Solutions are proposed that automatically balance performance and security by deploying an existing information hiding based baseline defense and then incrementally moving to more powerful integrity-based defenses when probing attacks occur. ProbeGuard is efficient, provides strong security, and gracefully trades off performance upon encountering more probing primitives.

It was an insight of the inventors that being vulnerable to probing in itself is not a fundamental limitation. It was an insight of the inventor that information hiding and integrity-check defenses are two extremes of a continuous spectrum of defenses against code reuse attacks, where they tradeoff between efficiency and security. Information hiding can still hold its ground if a system could detect the probing process and stop it before it breaks the defense.

In an embodiment, a fast baseline defense is provided for a program, e.g., information hiding. The embodiment continuously monitors a running program for an occurrence of a probing attempt. When such an attempt is encountered, its origin is automatically located, and the offending piece of code is patched at runtime with a stronger and more expensive integrity-based defense or defenses. In other words, strong defenses are applied selectively, as needed—resulting in strong protection with lower overheads.

In a first stage of an embodiment, e.g., of ProbeGuard, a form of anomaly detection may be used. Probing attempts are detected that characterize derandomization primitives. Interestingly, unlike traditional anomaly detection, false positives are less of a problem. They merely lead to more hardening of part of the program to make it more secure, albeit somewhat slower. For most probing attacks, the anomaly detection itself is simple and non-intrusive; for example, a monitor detecting repeated exceptions or other anomalies.

A second stage of the embodiment, namely probe analysis, uncovers the particular code site the attacker abused for probing, or simply put, the probing primitive. A particular efficient implementation leverages fast control-flow tracing features available in modern processors, e.g., such as Intel Processor Trace (Intel PT) [28]. This allows to conservatively pinpoint the offending code fragment in a secure way.

Finally, in a third stage, the program is patched, in particular hot-patched, by selectively replacing the offending code fragment with a hardened variant. Although, this piece of code may run slower, the instrumentation and thus the slowdown is limited to the fragment that was vulnerable. In principle, embodiments are agnostic to the hot-patching technique itself. An elegant way is to create a binary that already contains multiple versions of multiple of even all code fragments, where each version offers different levels of protection. Initially, the binary only runs efficient, instrumentation-free fragments. However, as and when the probe analysis exposes a code fragment used as a probing primitive, an embodiment, e.g., ProbeGuard, switches the corresponding code fragment to an appropriate hardened version.

Interestingly, embodiment provide a new point in the design space of code reuse defenses that automatically balances performance and security. The design may initially protect the system using, fast but weak, information hiding, and selectively transitions to, stronger but slower, integrity defenses, where and when needed. Low-overhead control-flow tracing capabilities, e.g., such as provided in modern processors, such as Intel PT, allow to efficiently pinpoint code fragments affected by the probing attempts. The anomaly detection may then trigger selective security hardening. Experimental evaluation shows that the implementation ProbeGuard is secure, efficient, and effective at countering probing attempts for a broad range of derandomization primitives.

A threat model is defined that is in line with related research in the recent past [23, 25, 32, 41, 43] (Table 1). A determined remote attacker is considered who aims to mount a code reuse attack over the network on a server application hardened by any ideal state-of-the-art information hiding-based defenses. For example, one can secure a server application against code reuse by deploying a modern defense such as Code Pointer Integrity (CPI) (including SafeStack) [33] or leakage-resistant variants such as Readactor [17] or TASR [12]. ProbeGuard's goal is to address the fundamental weakness of practical (information hiding-based) code-reuse defenses, making them resistant to attacks that derandomize hidden memory regions (safe region and trampoline code area respectively, here) and bypass the defense.

For example, one may consider an attacker who has the intent to mount a remote code reuse attack. The attack target may be, e.g., a server application with automatic crash-recovery. It is assumed, that the attacker has access to derandomization primitives [25, 29, 41] to probe the victim's address space, find sensitive defense-specific information, and bypass the defense. While the probability of finding the sensitive data in a 64-bit address space by accident using a single probe is negligible, it is assumed that the attacker has unlimited probing attempts as the application recovers automatically upon any crash. This is realistic, as even though probing attempts may each lead to a crash, real-world server applications typically have worker processes with built-in crash recovery functionalities to deal with unexpected run-time errors [41].

The ProbeGuard embodiment is implemented on a modern processor system that provides efficient control flow tracing, such as Intel Processor Trace which is available on Intel CPUs since Broadwell. The trace is accessible via the operating system kernel, beyond the reach of a remote application-level attacker. In an embodiment, the automated detecting and subsequent strengthening of vulnerable code may also be applied to operating system software, or to drivers, etc.

As pointed out, existing defenses can be classified into software integrity checks based and information hiding based defenses. It was an insight, that, despite its weaknesses, the latter remains a preferred choice for practical deployment.

Software Integrity

Whether the target is information leakage or code reuse exploitation, memory corruption attacks typically violate software integrity. To prevent this, software integrity defenses apply integrity checks throughout the application.

Many information leakage defenses add bounds checks on memory accesses. Examples include Softbound [39], CETS [40], Low-fat pointers [21], and Address sanitizer [45]. Modulo optimizations, such solutions verify all the program's loads and stores, as well as its memory allocation operations. They vary in terms of efficiency and how they manage (trusted) metadata. They often rely on static program analyses such as pointer alias analysis and pointer tracing and tend to be robust in the security guarantees they offer—except for the well-known (and fundamental) limitations of such analysis techniques. To counter code reuse attacks that modify the control flow of an application, solutions like Control Flow Integrity [8] (CFI) check each indirect control-flow transfer to see if it adheres to the application's static control-flow graph. Unfortunately, fine-grained CFI [19, 37, 38, 48] incurs significant performance costs and later variants [51, 52] therefore tried to balance security and performance guarantees. However, previous research has shown that doing so often significantly weakens security [24]. The overhead of fine-grained CFI can be as high as 21% [9] or as little as 9%, if limited protection of the forward edge [48]. Finally, SFI (Software Fault Isolation) [32, 50], a sandboxing technique, that prevents arbitrary memory access or corruption, incurs about 17-19.6% overhead for both reads and writes.

Defenses Based on Information Hiding

Defenses based on information hiding incur much less overhead as they eliminate expensive runtime checks and the integrity of hidden sensitive information rests solely on the attackers' inability to locate it. ASLR in particular serves as a first line of defense against code reuse attacks in many current systems. However, relying on ASLR alone is no longer sufficient when a variety of information disclosure vulnerabilities allow attackers to leak pointers to eventually break the randomization. Instead of merely hiding locations of entire applications, modern defenses therefore segregate applications into sensitive and non-sensitive regions and use probabilistic techniques based on ASLR to hide the sensitive regions.

Examples include CPI [33], ASLR-Guard [36], Oxymoron [11], Isomeron [20], TASR [12], and many others [15, 17, 47]. CPI [33] hides a safe region and a safe stack where it stores all code pointers. ASLR-Guard [36] hides pre-allocated keys that it uses for xor-based encryption of code pointers. Isomeron [20] and Oxymoron [11] hide runtime lookup tables to implement code randomization while, TASR [12] re-randomizes the process' memory layout and hides a list of activated code pointers. They make code reuse infeasible by hiding these sensitive data eliminating the need for pervasive integrity checks. Among them the leakage resilient variants [12, 15, 17, 36] provide protection against JIT ROP [20, 46] attacks, by preventing attackers from reading executable code regions in the memory.

All these techniques have very low runtime overheads. CPI-SafeStack reports less than 2%, ASLR-Guard less than 1%, Oxymoron 2.5%, and TASR 2%. Even if the security guarantees are less strong than integrity-based solutions, performance-wise, information hiding by means of randomization comes almost for free.

Attacks on Information Hiding

Unfortunately, information hiding is vulnerable to information disclosure. For instance, Evans et al. [22] attack the safe region of CPI by exploiting data pointer overwrite vulnerabilities, leaking the safe region's location through fault and timing-based side channels.

On a coarser level, Blind ROP (BROP) [13] exploits stack vulnerabilities to poke blindly into the address space and make the program jump to unintended locations. By observing the resulting crashes, hangs and other behaviors, attackers eventually find interesting gadgets—albeit after many crashes. CROP [23], on the other hand, by abusing reliability features such as exception handling, prevents a crash upon probing inaccessible memory, making the probes stealthier.

Allocation oracles [41] scan the address space, indirectly. Rather than trying to access the allocated hidden regions, they infer their location by probing for unallocated holes. By trying many large allocations and observing whether they succeed or not, the attacker eventually finds the sizes of the random-sized holes and, hence, the location(s) of the hidden regions.

Cache-based timing side-channels form another class of derandomization primitives. AnC [26] for example, recently demonstrated using probes based on local cache accesses to bypass ASLR protection. Such attacks require access to the local system providing an execution environment for attackers' code (e.g., a Javascript engine). However, randomization-based defenses are designed to protect against remote attacks and not against local attacks. A remote attacker targeting a server application cannot use such derandomization primitives because of lack of access to its local system.

| Defense | Arbitrary read | Arbitrary write | Arbitrary jump | Allocation oracle |
| --- | --- | --- | --- | --- |
| CCFIR | X | | | X |
| O-CFI | X | | | X |
| Shadow stack | | X | | X |
| StackArmor | X | X | | X |
| Oxymoron | X | X | X | X |
| Isomeron | X | X | X | X |
| CPI | X | X | | X |
| ASLR-Guard | X | X | X | X |
| LR2 | | X | | X |
| Readactor | | | X | X |

The above table shows existing classes of derandomization primitives for a remote attacker, viz., arbitrary read, write and jump vulnerabilities along with memory allocation based primitive, and illustrates those suitable to attack the listed information hiding based modern defenses. For all of these classes, ProbeGuard currently implements anomaly detectors and reactive hardening. Although this captures a wide set of foundational primitives, it is not claimed that the table is exhaustive as researchers keep finding new primitives. It is noted, that derandomization techniques typically require multiple probing attempts before they eventually break the randomization and since they must provide useful signals to the attacker, they all tend to have some unusual characteristics. ProbeGuard mitigates such attacks by reducing the number of probing attempts available to an attacker for a given primitive to just one detectable probe.

Figure 3:
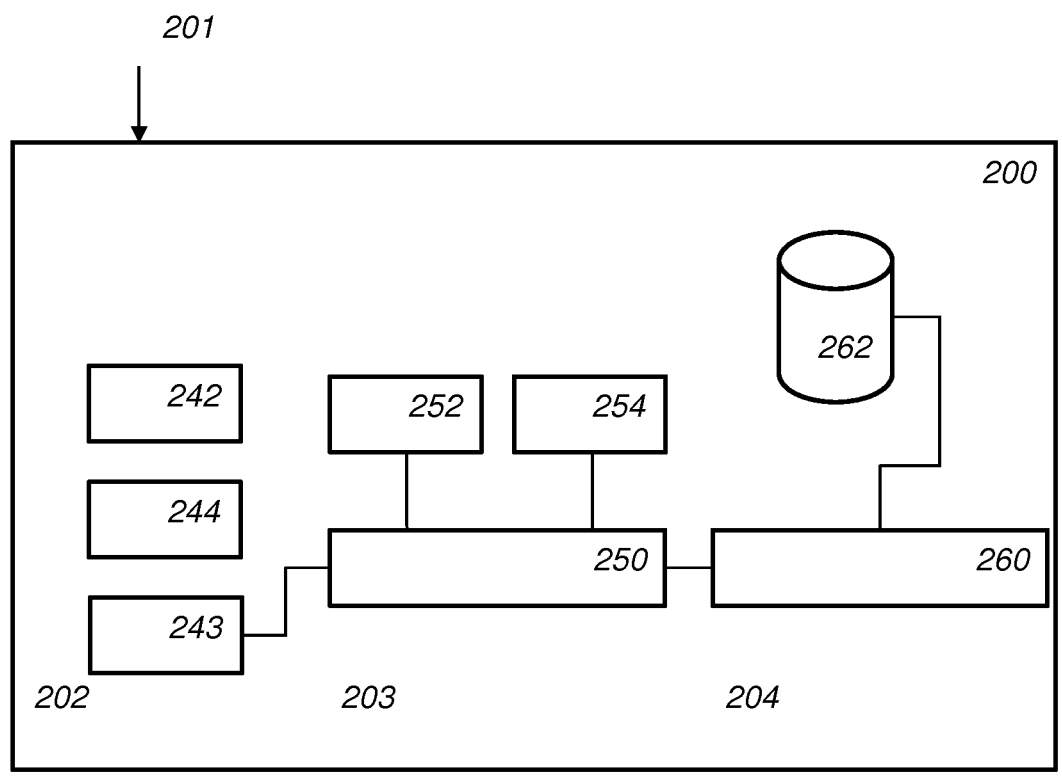
Figure 3:
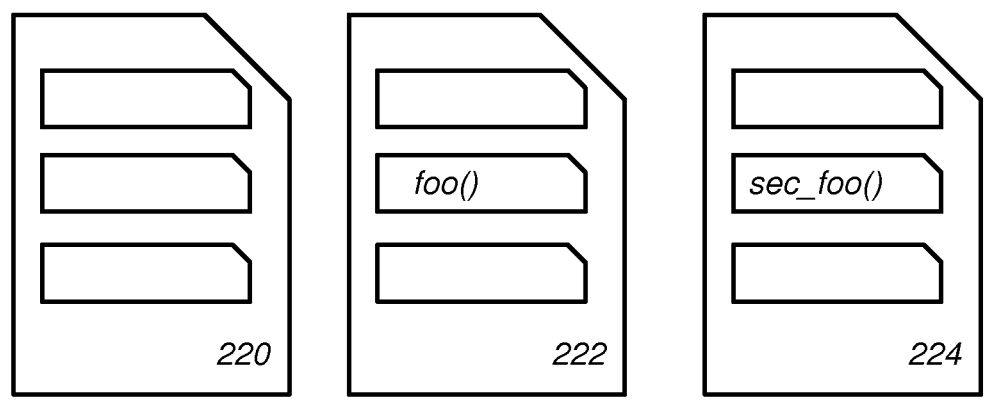

FIG. 3 schematically shows an example of an embodiment of a computing device 200 and schematically shows an example of an embodiment of a computing method. Computing device 200 may comprise one or more anomaly detecting units, shown are anomaly detecting units 242, 243, 244. The anomaly detecting units monitor a computer program 220. Computing device 200 may further comprise a probe analysis unit 250, which may use a runtime execution trace 252 and/or a LLVM IR 254. At some point during the workflow a vulnerable spot is identified by probe analysis unit 250 in the code part foo( ). This is illustrated as a computer program with identified vulnerable spot 222. Computing device 200 may further comprise hot-patching unit 260 and/or a security hardened code cache 262. After the vulnerable spot is addressed, in this case, by replacing the code part foo( ) with the hardened sec_foo( ), a hardened computer program 224 is obtained. A possible workflow comprises 201) An attacker makes a probing attempt; 202) One of the anomaly detector senses and triggers reactive hardening; 203) The probe analyzer identifies the offending spot; 204) The hot-patcher replaces the offending spot on-the-fly with its hardened variant.

In an embodiment, after first protecting an application with any state-of-the-art information hiding-based defense, e.g., as a baseline defense, improves the protected application against derandomization; For example, this may use a compiling method according to an embodiment. The resulting binary can then run in production. FIG. 3 shows how an embodiment such as ProbeGuard may operate at runtime on a hardened application. An attacker may probe 201 the application using a derandomization primitive in an attempt to break information hiding and bypass the baseline defense. Say, the attacker uses a buffer overflow vulnerability to corrupt a data pointer that the application reads from. In principle, she can use this arbitrary memory read primitive [22] to probe random memory addresses, looking for the hidden region. However, a random probe most likely hits an invalid address in a huge 64-bit address space, triggering a segfault. In an embodiment, an anomaly detection is included that detects this and triggers reactive hardening.

A detected anomalous event, may temporarily stop the application and invoke probe analysis, which analyzes the current execution context to find the offending code fragment by utilizing a trace, e.g., obtained from efficient and tamper-resistant branch tracing facilities, such as Intel PT. In an embodiment, the trace, e.g., obtained via the kernel is lifted by mapping binary instruction addresses back to its source information to locate the code fragment that the attacker used as probing primitive—even under attack when user memory can no longer be trusted.

The hot-patching component 260 may now on the fly replace just the pinpointed code fragment, e.g., function foo( ) in the figure, with a semantically-equivalent but hardened version, e.g., function sec_foo( ) in FIG. 3. The new code fragment may include targeted integrity checks that stop the attacker's ability to use the offending primitive, though possibly at the cost of slowing down the execution of just that fragment. In the above example, an embodiment such as ProbeGuard can insert software fault isolation (SFI) [50] checks in this code fragment, limiting the probe primitive's access to regions far away from the hidden region, thus protecting the hidden region from malicious accesses. The embodiment may then activate the new code fragment by piggybacking on recovery functionalities of the target application. For example, the recovery functionalities fork to replace a crashed child, e.g., as may be done on an Nginx server. Further probing attempts using the same primitive, whether or not they lead to a crash, cease to produce desirable signals for the attacker.

The section below details the architecture and design of a particular embodiment, called ProbeGuard. The design goals for ProbeGuard included (i) to mitigate probing attempts on protected applications through reactive hardening, and (ii) to balance security and performance. An application employs information-hiding based state-of-the-art defenses, while ProbeGuard makes it more likely that what is hidden remains hidden.

Figure 4:
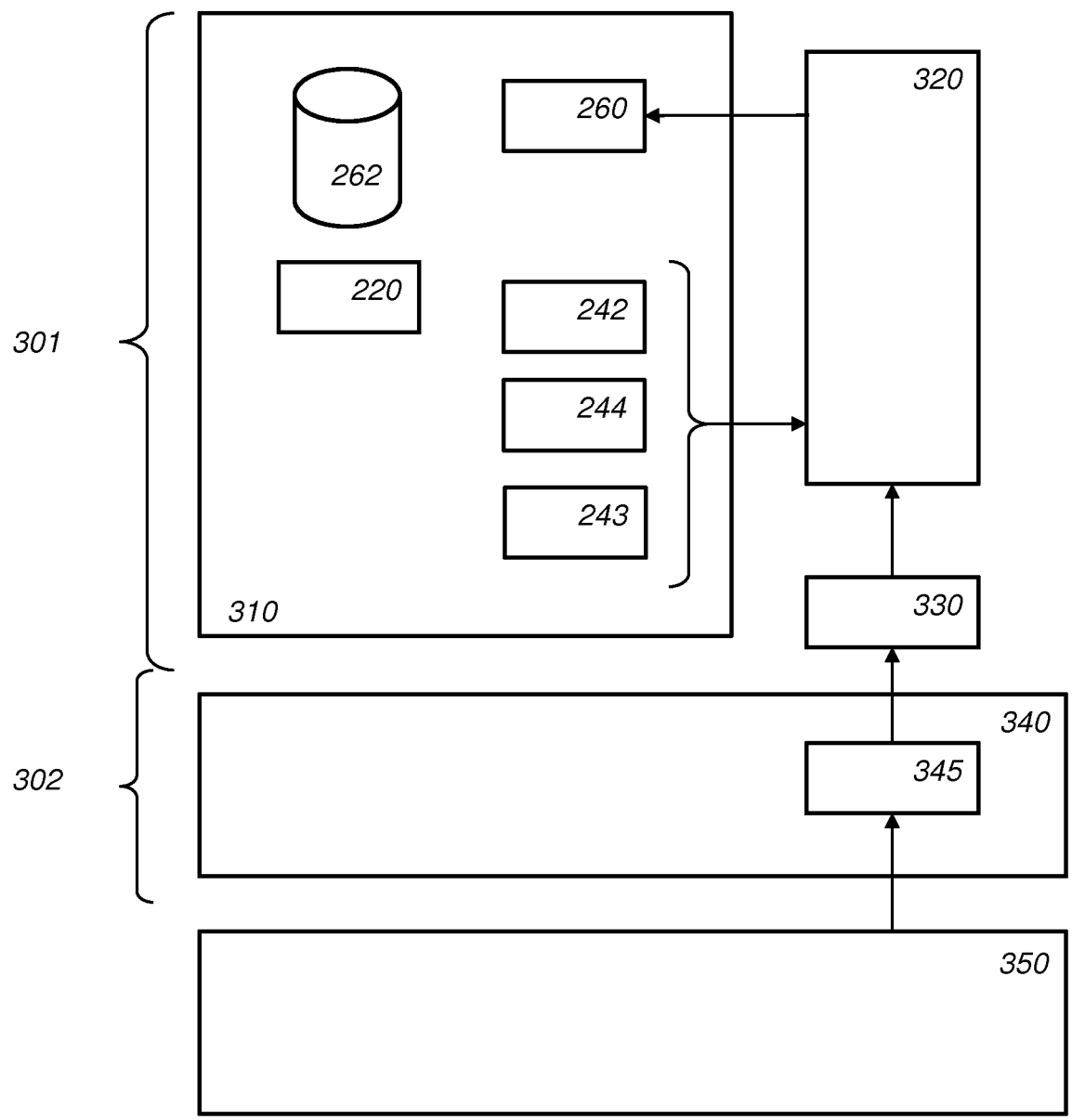

FIG. 4 schematically shows an example of an embodiment of a computing device 300. Shown in FIG. 4, is a hot-patching unit 260, a security hardened code cache 262, a computer program 220 and one or more anomaly detecting units, shown are anomaly detecting units 242-244. These components are protected by an information hiding based defense 310. FIG. 4 further shows a reactive defense server 320, and PT library 330. In an embodiment, these parts may run in user space 301.

FIG. 4 further shows an operating system 340, which comprises a PT recording unit 345. These components may run in kernel space 302. FIG. 4 also shows hardware 350.

FIG. 4 shows the main components of a ProbeGuard embodiment. The anomaly detectors may be embedded within the application that sense probing attacks and a code cache comprising a collection of code fragments hardened by applying LLVM [35]-based integrity checking instrumentations. A separate reactive defense server 320 decodes Intel PT traces and performs fast probe analyses. Probe-Guard may reactively activate hardened code fragments by hot-patching when under attack. In the following, components that make up this embodiment of ProbeGuard are discussed; it is explained how they achieve their design goals.

Anomaly Detection

An attacker may use several classes of derandomization primitives. The ProbeGuard embodiment employs dedicated anomaly detectors to efficiently and immediately detect any probing attempt.

Arbitrary reads and writes: An attacker may exploit an arbitrary memory read or write vulnerability in the application with the goal of derandomizing the hidden region. Typically, only a very small fraction of the application's virtual address space is actually mapped. So, when the attacker uses such a vulnerability to access a random address, it is likely to hit an unmapped virtual memory address leading to a segmentation fault (or a crash). On UNIX-based systems, for example, the operating system sends a SIGSEGV signal, which typically results in an application crash (and recovery). Such probing attacks are detected by simply handling and proxying the signal using a custom SIGSEGV handler. Even in the case of buggy or unusual SIGSEGV-aware applications, this would not affect (or break) application behavior, but as a consequence, only increases the application's hardened surface.

Kernel reads and writes: Attackers prefer probing silently and avoid detection. Hence, to avoid the crashes, they could also attempt to derandomize the victim application's address space by probing memory via the kernel. Certain system calls, e.g., reads, accept memory addresses in their argument list and return specific error codes, e.g., EFAULT, if the argument is a pointer to an inaccessible or unallocated memory location. Using arbitrary-read/write primitives on such arguments, they could attempt CROP [23] attacks to enable probes eliminating application crashes (thereby not generating SIGSEGV signals). Such probing attacks are detected by intercepting system calls, either in glibc or directly in the kernel, and inspecting their results. As these events are, again, very unusual, they are identified as anomalies and trigger reactive hardening. In our prototype, the system calls are intercepted at the library level, since doing so minimizes complexity in the kernel and benign applications that directly invoke system calls are rare.

Arbitrary jumps: Some vulnerabilities allow attackers to control the instruction pointer, effectively giving them an arbitrary jump primitive. For example, leakage-resilient techniques that defend against JIT-ROP attacks [46], such as XnR [10] and Readactor [17] are vulnerable to arbitrary jump primitives. But, these primitives may not be applicable to target other defenses—e.g., those that provide both forward- and backward-edge CFI protection. Arbitrary jump primitives allow scanning the address space looking for valid code pointers and then, locate code gadgets. BROP [13], for example, turns a stack write vulnerability into an arbitrary jump primitive. As in the case of arbitrary read and write vulnerabilities, an attempt to execute unmapped or non-executable memory results in either a segmentation fault (raising a SIGSEGV signal) or an illegal instruction exception (raising a SIGILL signal) as the memory region may not contain valid machine instructions. To detect these probing attacks, the custom signal handler was extended to handle both the signals and trigger reactive hardening as explained earlier.

Allocation oracles: Oikonomopoulos et al. show that information hiding based defenses are susceptible to attacks that use allocation oracles [41]. Such probes exploit memory allocation functions in the target application by attempting to allocate large memory areas. Success or failure of the allocation leaks information about size of the holes in the address space, which in turn, helps locate the hidden region. These probes can be detected by looking for unusually large memory allocation attempts; For example, by hooking into glibc to intercept the system calls used to allocate memory (e.g., mmap( ) and brk( )). The more widely used allocation calls (e.g., malloc( )) get intercepted indirectly as they internally rely on these system calls to obtain large memory areas from the operating system. A configurable threshold is provided on the allocation size, above which our detector triggers reactive hardening (half of the address space by default).

Other primitives: While all the widely used derandomization primitives are covered, researchers may well find new primitives in the future. So, it is impossible to assure detection of all kinds of probes preemptively. Nonetheless, any useful probe is likely to: (i) provide clear and distinct signals to the attacker—the same should help in detection too, and (ii) probe memory, so, application-level detection shall remain viable because a remote attacker has no access to other ways that use external or hardware-based side-channels as discussed earlier. In an embodiment, the computation device is extensible by including new detectors whenever new primitives surface.

Probe Analysis

Upon an anomaly detector flagging a potential attack, ProbeGuard may determine the probing primitive used, or, in other words, locate the offending code fragment—which is referred to as "probe analysis". A derandomization primitive might as well make use of undetectable buffer over-read and over-write vulnerabilities that may write to some other pointers within a valid mapped memory area, which eventually get dereferenced elsewhere during the application's execution. Note that, the final effect of the primitive, in this case, the spot where corrupted pointers are dereferenced, and its code location matters more than the location of the corresponding vulnerabilities for inhibiting the attack. This is because it is final manifestation of the vulnerability that gives the attacker the capability to derandomize the memory address space, which is what is referred to as a probing primitive. To locate the probing primitive, hardware-assisted branch tracing may be employed to fetch the control flow prior to when the anomaly is detected. A reverse mapping was built to fetch source-level information from the trace. This is used for program transformation-based hot-patching in ProbeGuard.

Past executed control-flow may be obtained using Intel PT that offers low-overhead and secure branch tracing. Control bits in CPU's model-specific registers (MSRs) allow an operating system kernel to turn this hardware feature on or off. Intel PT stores highly com-pressed trace packets in a circular buffer in the kernel's memory space, beyond the reach of an attacker in user-land. The buffer size is configurable; typical values range from 2 MB to 4 MB or more. ProbeGuard does not require a very deep peek into the past. The buffer needs to hold just enough to point beyond any execution in library/external functions. For example, a similar execution tracing feature, Last Branch Record (LBR) from Intel saves the last 16 branches executed. This will work, though in some cases may be insufficient to provide enough visibility into the past. Although decoding the trace data is much slower than the fast recording, it is only rarely needed (upon being probed). Moreover, the processing times remain acceptable for our purposes, because the backward trace analysis can limit itself to only the relevant recent control-flow history and avoid decoding all of the trace in its entirety.

On Linux, the perf record interface allows users to trace Intel PT events on a per-process and even per-thread basis in the target application (using the—per-thread option). In an embodiment, the snapshot mode is used [3,30] which dumps the trace when required; e.g., when an anomaly gets detected. Although the decoded trace provides sequence of code addresses executed right until the detected anomaly, mapping them back to the source code and determining the offending code fragment is still hard.

The probe analyzer is configured to locate the affected spot in the source code. In an embodiment, a field in LLVM's debug metadata was repurposed that normally carries column number of the source code location to instead place respective basic block identifiers. This only simplifies our prototype implementation to let LLVM's default code generator, pass on the metadata through DWARF 4.0 symbols onto the resulting application binary, instead of having to use a new metadata stream and write supporting code. With this, a facility may be built for reverse mapping from code addresses in the trace, onto the binary, all the way to where it belongs in the application's LLVM intermediate representation (LLVM IR or "bitcode"). Although ProbeGuard can identify the offending fragment at the basic block level, this embodiment marks the entire parent function that includes the probing primitive and uses this for hardening, as this strategy simplifies hot-patching and offers better security.

Hotpatching

Probe analysis provides the following information: (1) the particular code fragment under attack (the probing primitive), and (2) type of the derandomization primitive, as indicated by the anomaly detector that triggered the reactive hardening. Using these, ProbeGuard's hot-patcher can select appropriate security hardening to thwart any further probing attempts that use the same primitive.

To facilitate hot-patching, the program was first transformed using the LLVM compiler passes. The goal is to be able to quickly and efficiently replace each vanilla variant of a function with a different (hardened) variant of the same function at runtime. All functions found in the target application's LLVM IR were cloned and selectively invoke security-hardening instrumentation passes on specific function clones at compile time. The program executes the uninstrumented variants by default, resulting in good performance, but has the set of instrumented variants available in a code cache to instantly switch to the appropriate instrumented variant at runtime when anomalous events demand better security.

Figure 5A:
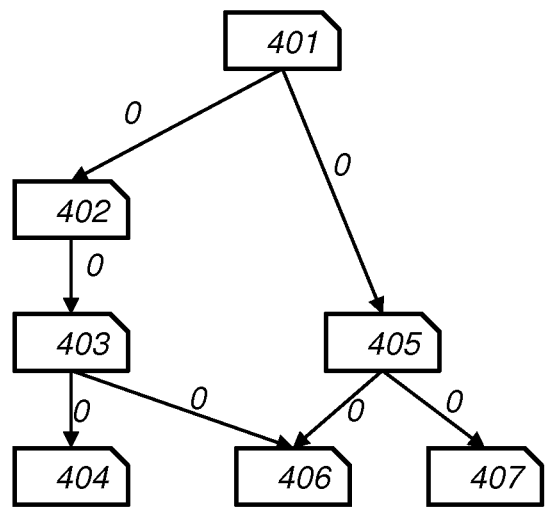
Figure 5B:
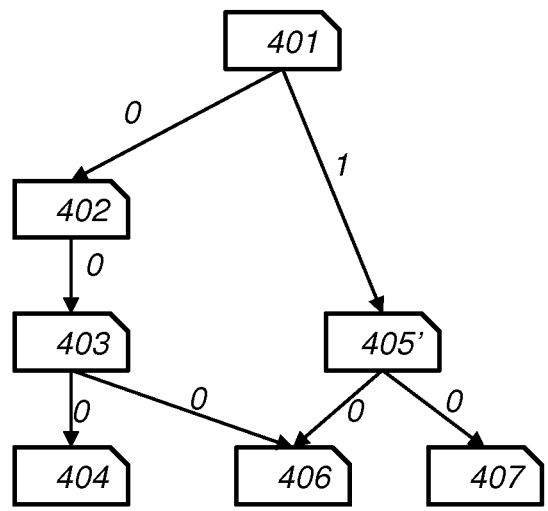

FIGS. 5a and 5b schematically show an example of an embodiment of replacing a computer program part. For example, ProbeGuard may use the hot-patching strategy depicted in FIGS. 5a and 5b. FIG. 5a shows replacement data 435, or switchboard data, and code parts 401-407. Initially, the replacement data 435 is filled with data that indicates that normal, e.g., unhardened, versions of the code parts are to be used. This is indicated with the data '0'. The flow chart shown in FIG. 5a also shows a number of 0's to indicate that initially each code part is executed in the normal form. At some point a vulnerability is found in code part 405. Code part 405 can be replaced by indicating in the replacement data 435 that the hardened version is to be used for code part 405. This is indicated in updated replacement data 435' with a data '1'. Also in the flow chart has it been indicated that the hardened version 405' is to be used instead of code part 405.

A global switchboard, such as replacement data 435, which may be inserted in the application, allows switching between each function variant at runtime. It may contain an entry for each function in the program, controlling which of the variants to use during execution. In an embodiment, every function in the application consults the switchboard and switches to its appropriate variant. In an embodiment only two variants are used: one for the vanilla version and one for the hardened version; the latter instrumented with all the supported hardening techniques. Further embodiment support more variants and patch each affected function with the variant hardened against the offending primitive type. Using only two versions, is simpler though and provides better memory usage, and better performance during regular execution, though possibly worse during hardened variant execution.

To deter attacks against ProbeGuard, the switchboard may be marked as read-only during normal execution. One can also rely on information hiding itself to protect the switchboard as done for our hardening techniques as necessary, given that ProbeGuard avoid probing attacks against arbitrary hidden regions.

Selective Security Hardening

Having seen possible probe detection, probe analysis and hot-patching in an embodiment of ProbeGuard, the possible instrumentations are now described that may be used for reactive hardening, preferably, a set covering all the fundamental probe-inhibiting integrity defenses. For example defenses may include: limiting read and write accesses, setting thresholds on data values and preventing targeted control-flow diversions. Thwarting a probing primitive implies stopping it from producing a usable signal for derandomization. For example, a probing primitive, when hot-patched produces crashes for any illegitimate memory access—whether within mapped or unmapped memory areas. So, the primitive no longer remains usable for probing as it ceases to provide perceivable signals to the attacker. The selection of defenses to apply for each attack may be based on the options presented in the Table above.

Arbitrary reads and writes: Software Fault Isolation (SFI) [50] mitigates probing attempts that use arbitrary reads and writes. It instruments every load or store operation in the application binary by masking the target memory location with a bitmask. For example, in the prototype, within the usable 48 bits of 64-bit virtual address space, it is ensured that 47th bit of the memory pointer used within the target application is always zero before dereferencing it (only the deployed code reuse defense instrumentations continue to access the hidden region as they should). Thus, by restricting the hidden region to virtual addresses with the 47th bit set (hidden address space), the attacker can no longer use an SFI-instrumented function for probing. Although this loses one bit of entropy, this makes it much more secure by protecting the remaining bits.

Kernel reads and writes: While one cannot selectively apply SFI within the kernel itself, one could apply a variation in the application to defend against kernel-based reads and writes. All pointer arguments to library calls may be masked in the same way as loads and stores against arbitrary reads and writes are masked. This ensures that the attacker cannot perform system calls that access hidden regions. The checks take into account any size arguments that may otherwise help in bypassing the defense.

Arbitrary jumps: Targeted Control Flow Integrity (CFI) checks can mitigate arbitrary jump primitives. CFI restricts the program to its known and intended sets of control flow transfers [8]. Its strictest form is rarely used in practice as it incurs significant performance overhead. Numerous CFI variants in the past have sought to balance security and performance, but studies [24] show that toning down security guarantees by any margin exposes CFI to practical attacks. However, our goal is not to protect the entire application from code reuse attacks (the baseline defense does that already), but to prevent the attacker from using the same probing primitive again to reveal the hidden regions. For this purpose, one can use even the strongest CFI protection without much overhead. In our current prototype, the following checks were implemented to neutralize probes that divert control flow.

Forward-edge protection: An attacker can corrupt a code pointer used by a particular indirect call instruction for probing purposes. One can prevent this attack if one labels every potential target of an indirect call (address of any function that has its address taken) and instrument indirect calls to verify that the call target has a matching label. Static analysis at compile-time can be used to determine which labels are potential targets for each indirect call. The more restrictive the set of possible target labels gets, the better the CFI protection gets. As our focus is more on evaluating the overall impact of selective hardening, a type-based CFI policy similar to IFCC [48] was implemented in our current prototype. However, in a selective hardening scenario, more sophisticated policies, normally inefficient at full coverage (e.g., context-sensitive CFI [49] piggybacking on the full Intel PT traces available in ProbeGuard), are also viable.

Backward-edge protection: Alternatively, an attacker could corrupt return addresses on the stack to divert control flow and probe the application's address space. A per-thread shadow stack is implemented that stores return addresses to be able to prevent such control-flow diversions. Function entry points are statically instrumented to push the return address onto the shadow stack and at function return points to check that the return address is still the same as the one in the shadow stack. The shadow stack itself is protected using information hiding by randomly placing it in the hidden address space. Any attempt is prevented to detect its location by reactively deploying our other defenses (e.g., SFI) as necessary. Targeted function-wise protection by shadow stack suffices against probes because, without a detectable probing attempt elsewhere in the code base, an attacker cannot influence unprotected parts of the call stack, particularly for reconnaissance.

Allocation oracles: To mitigate probing attacks that aim to perform memory scanning through memory allocation primitives, a threshold is applied on the size arguments of library functions that provide memory allocation utilities, such as the malloc family of functions by instrumenting their call sites. It is noted though that applications may perform very large allocations during their initialization phase. A completely agnostic threshold-based anomaly detector would prevent even such legitimate memory allocations. A white-listing scheme is used for such cases, distinguishing them by the nature of the size argument. If this argument originates from a constant in the application (e.g., a value the attacker cannot control by construction), or even defenses like CPI [33]-which initially reserves huge constant-sized buffers for shadow memory-based metadata management, then they are deemed to be harmless.

IMPLEMENTATION EXAMPLE

| Module | Type | #SLOC |
| --- | --- | --- |
| Anomaly detection | C static library | 598 |
|  | Changes to glibc | 51 |
| Reactive Defense Server | Python | 178 |
| Probe Analysis | C program | 1,352 |
| Hotpatching | C++ LLVM passes | 1,107 |
| Hardening C | C static libraries | 340 |
|  | C++ LLVM passes | 1332 |

The above table shows SLOC counts for modules in a ProbeGuard embodiment. This ProbeGuard implementation comprises:

(1) a static library linked with the application: It houses a signal handler registered at startup. The signal handler takes actions depending on the type of anomaly, raising a signal of interest (e.g., SIGSEGV); It also interposes on application-defined signal handler registrations (e.g., sigaction calls) to preserve and chain invocations. Finally, it helps in hot-patching to support switching between function variants at runtime.

(2) glibc modifications to intercept mmap( )-like syscalls to detect huge allocation primitives and syscalls that result in EFAULT to detect CROP-like primitives.

(3) LLVM compiler passes to generate and propagate function identifying markers onto the binary via DWARF 4.0 symbols (necessary to build reverse mappings) and function cloning to facilitate hot-patching and (4) a separate reactive defense server that does probe analysis by fetching Intel PT traces using libipt [4] to map them onto the binary by reading the markers using libdwarf [7].

Note that many other choices for implementation are possible, using different modules, a different number of modules, different implementation languages, etc. Besides, we implemented other LLVM instrumentation passes for hardening that insert SFI, CFI, and allocation-size checks selectively at function granularity.

The table shows the number of source lines of code (SLOC) in a ProbeGuard implementation, as reported by SLOCCount. The anomaly detection components interact with the reactive defense server via traditional inter-process communication, e.g., UNIX domain sockets. This is to request probe analysis and receive results to ultimately operate hot-patching. The latter is done by updating the global switchboard to switch the offending code fragment to its hardened variant. In principle, a binary-only implementation of ProbeGuard is also possible. The probe analysis already maps code locations in Intel PT trace dump to their counterparts in the binary using DWARF 4.0 based markers, which were even extended to LLVM IR in an embodiment. Binary rewriting technique can support implementing a global switchboard based control of function variants. We chose a source-level implementation because many information hiding based defenses we aim to protect also happen to rely on source code based analysis and transformation techniques.

We evaluated the ProbeGuard prototype on an Intel i7-6700K machine with 4 CPU cores at 4.00 GHz and 16 GB of DDR4 memory, running the 64-bit Ubuntu 16.04 LTS Linux distribution. We compared programs instrumented by ProbeGuard against a baseline without any instrumentation. We use an uninstrumented baseline to simulate a configuration akin to an ideal information hiding-based defense (and thus as efficient as possible). We note that this is a realistic setup, as many information hiding-based defenses report performance figures which are close to this ideal baseline. For example, Safe-stack reports barely any overhead at all in standard benchmarks [33]. In an embodiment, all multiple integrity-based defenses are combined together into a single hardened variant for each function in the program.

We evaluated ProbeGuard on the SPEC CPU2006 benchmarks as well as on the Nginx web server, which has been repeatedly targeted by probing attacks. We used Apache-Bench [6] to benchmark the web server, issuing 25,000 requests with 10 concurrent connections and 10 requests per connection, sufficient to saturate the server. Our set of programs, benchmarks, and configurations reflect choices previously adopted in the literature.

Our evaluation focuses on five key aspects of Probe-Guard: (i) performance overhead of ProbeGuard (how fast is ProbeGuard-instrumented version of a program during regular execution?), (ii) service disruption (what is the impact on the execution during repeated probing attack attempts, each triggering trace decoding and hot-patching?), (iii) memory overhead of ProbeGuard (how much more memory does a ProbeGuard-instrumented version of a program use?), (iv) security (what is the residual attack surface?), (v) effectiveness (can ProbeGuard stop existing probing-based exploits?).

Performance Overhead

Figure 6A:
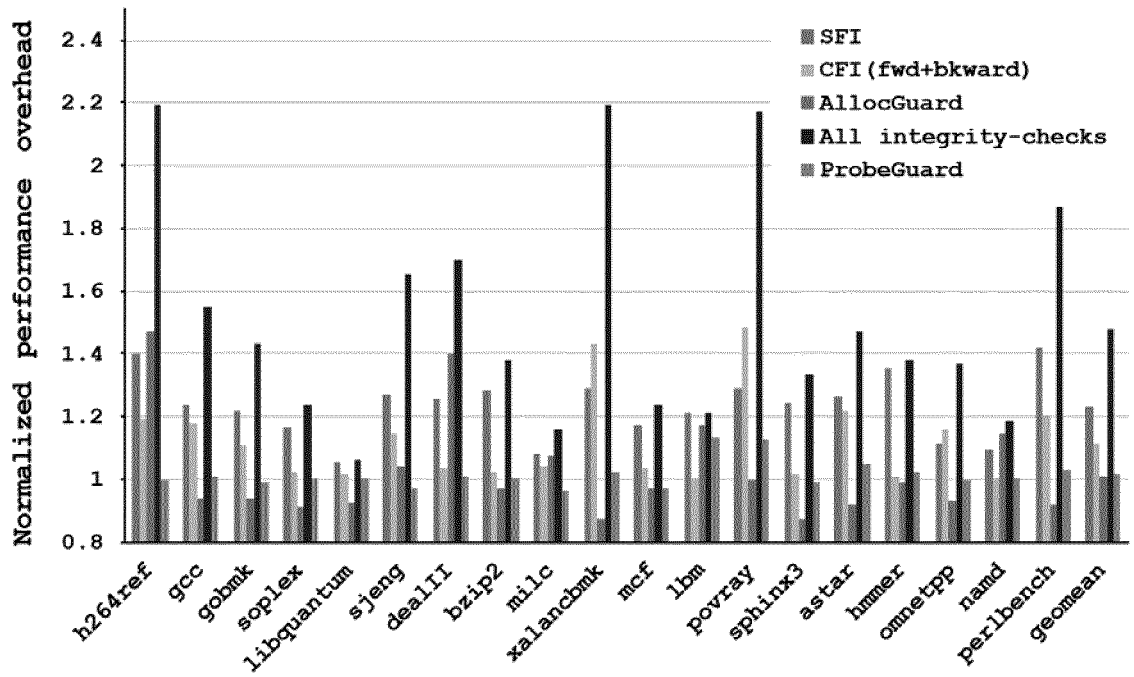
FIG. 6a shows normalized performance overhead of SPEC CPU2006 for an embodiment of the invention and several full-coverage integrity defenses.

We first evaluated the overhead that ProbeGuard alone adds during regular (attack-free) execution, on the full set of SPEC CPU2006 benchmarks. This measures the overhead of our runtime components along with Intel PT branch tracing. FIG. 6a show normalized performance overhead of SPEC CPU2006 for an embodiment of the invention and several full-coverage integrity defenses. As shown in FIG. 6a, the average (geomean) overhead of our solution is only 1.4%. FIG. 6a also shows the normalized performance overhead of the individual integrity defenses when applied throughout the application during regular execution—SFI, CFI (both forward and backward edge protection) and AllocGuard (allocation-size thresholding), with average (geomean) overheads of such defenses being 22.9%, 11.5% and 1.3% respectively, along with an all-combined variant with an overhead of 47.9%, which is much higher than our solution. This is expected, as ProbeGuard's basic instrumentation is lightweight, with essentially a zero-overhead anomaly detection. The residual overhead stems from Intel PT's branch tracing activity (which can be also used to support other defenses) and slightly worse instruction cache efficiency due to larger function prologues (padded with a NOP sled). The latter overhead is more prominent in benchmarks that contain very frequent function calls in the critical path (e.g., lbm, povray and perlbench).

Further, we measured throughput degradation in Nginx server by running the Apache benchmark. The attack-free ProbeGuard-instrumented version of the server reported a degradation of only 2.4% against the baseline. This demonstrates that ProbeGuard is effective in significantly reducing the overhead of full-coverage integrity-based solutions, while retaining most of their security benefits.

Figure 6B:
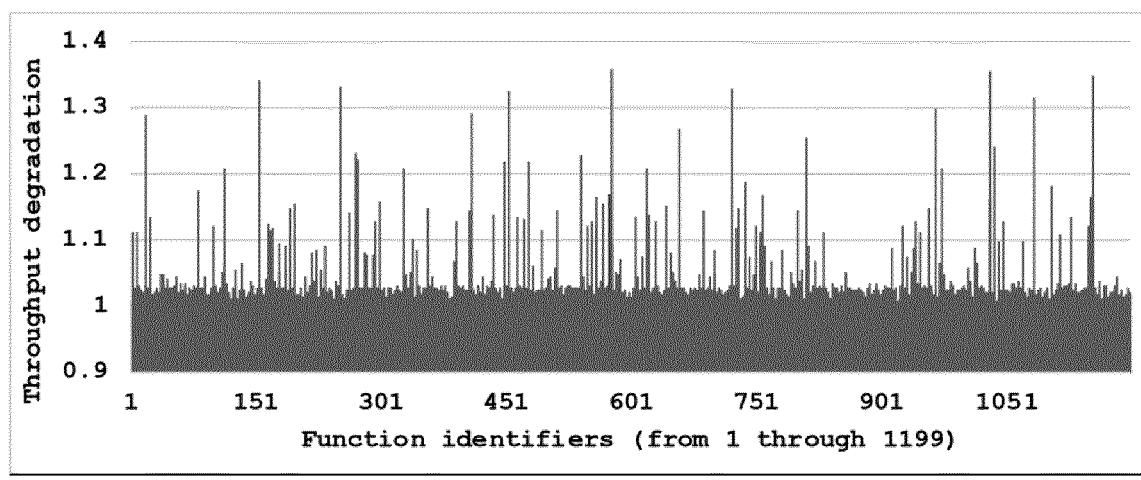
FIG. 6b shows throughput degradation for an embodiment for Nginx functions, with function identifiers from 1 through 1199.

In order to assess how overhead varies when an ideal attacker locates several probing primitives, we measured the overhead separately, that each function adds upon hardening, in Nginx. FIG. 6b shows throughput degradation for an embodiment for Nginx functions, with function identifiers from 1 through 1199. FIG. 6b. It shows that frequently executed functions have greater impact and as we see, the worst-case function (e.g., on the critical path) has an impact of 36% on throughput.

Service Disruption

Figure 6C:
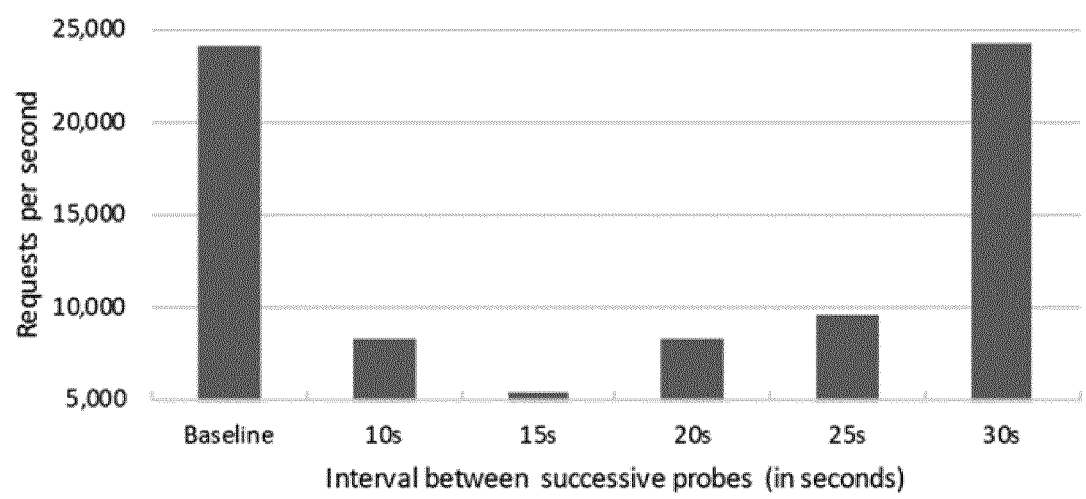
FIG. 6c shows requests per second versus an interval in seconds between successive probes to illustrate throughput degradation for an embodiment on Nginx for varying probing intervals, FIG. 7a schematically shows an example of an embodiment of a computing method, FIG. 7b schematically shows an example of an embodiment of a compiling method, FIG. 8a schematically shows a computer readable medium having a writable part comprising a computer program according to an embodiment, FIG. 8b schematically shows a representation of a processor system according to an embodiment.

To simulate worst-case attack conditions, we also subjected the ProbeGuard-instrumented Nginx server to repetitive probing attempts, in increasing intervals. Although, in practice, a heavy influx of probing attacks is highly unlikely, given that it would require uncovering a huge number of unique probing primitives (each in a distinct function), this serves as a stress benchmark for on-the-fly probe analysis and hot-patching that piggybacks on the server's inherent crash recovery functionalities (throughout which the server remains temporarily frozen). FIG. 6c shows requests per second versus an interval in seconds between successive probes to illustrate throughput degradation for an embodiment on Nginx for varying probing intervals. FIG. 6c depicts the throughput degradation incurred by the Nginx web server for varying probing intervals. For probing intervals of 10, 15, up to 25 seconds, throughput drops between 60%-78%. However, with larger intervals between the probes viz., 30 seconds onward, we saw no observable impact on the throughput. This clearly shows that probe analysis and hot-patching take only a few seconds and do not adversely affect service availability even under aggressive attacks (even though such attack rates are infeasible in practice).

Memory Overhead

We measured the memory overhead of ProbeGuard on the SPEC CPU2006 benchmarks. The computed resident set size (RSS) re-mains marginal (1.2% on average, geometric mean) during regular execution. On Nginx, while running the same Apache benchmark, we saw a mean increase in RSS memory usage of approximately 350 KB, which would include a constant size additionally occupied by the switchboard. This shows that ProbeGuard can be realistically applied to real-world applications with low overhead.

Security

We evaluate ProbeGuard's security guarantees against concerted probing attacks on information hiding-based defenses and then dis-cuss potential strategies for an attacker to circumvent ProbeGuard.

A probing attack follows a strike-and-observe pattern, typically involving several attempts before leaking precious information on the victim application. Table 4 depicts the security guarantees that ProbeGuard offers for a number of representative hidden region sizes drawn from common information hiding-based defenses (using Nginx as a reference). As shown, such sizes may range from an ideal case of a single memory page (4 KB) to the few GBs of virtual memory CPI uses, with their entropy respectively ranging from 34 to 14 bits. Note that we calculated the entropy for CPI's hashtable and lookup table (CPI's recommended information hiding configurations) based on the conservative estimates reported by the authors for a 1 GB resident set size (RSS) [34].

Compared to traditional information hiding, ProbeGuard sacrifices one bit of entropy (SFI enforcement) starting from a 47-bit user-addressable memory address space. This doubles the probability P(region\#p=1) of locating the hidden region at the first attempt with a given primitive (except for allocation primitives, where ProbeGuard preemptively stops any probing attempts in any case). Nonetheless, such probability remains extremely low (2-14 in the worst case—CPI's lookup table) to mount a practical attack. Moreover, after the first attempt, traditional information hiding imposes no restriction on the attacker, whereas ProbeGuard triggers reactive hardening that stops any further use of the same probing primitive. The only option the attacker has, is to locate any other primitive in a different function to try probing again. For example, an attacker can use arbitrary read or write primitives to follow pointers and traverse all valid data memory. Thereafter, they can modify any pointer that will be dereferenced along any execution path (possibly in several different functions) that can be invoked remotely to probe the memory. While this is already impractical as this requires uncovering several probing primitives, the underlying entropy dictates locating as many as, around 214=16, 384 primitives, each in a distinct function in the best case (CPI's lookup table) for the attack to be fully reliable. This is hard in general and for an Nginx-like server program in particular, given that it only contains 1,199 functions in total. Even in the ideal, non-realistic scenario where an attacker has found one primitive for each function in the program, the probability of locating the hidden region P(region\#p=MAX) is still insufficient to mount practical attacks for all the hidden region sizes considered. Nonetheless, Table 4 does show that the hidden region size has a strong impact on the security upper bound guaranteed by ProbeGuard.

We now consider other strategies an attacker may employ to attack ProbeGuard. First, an attacker may attempt to craft new, unknown probing primitives not yet supported by ProbeGuard. While this is a possibility, ProbeGuard is also extensible to support detection of new primitives. Nevertheless, we cannot discount the possibility of new primitives that would be hard to adequately sup-port in the existing framework (e.g., if anomaly detection cannot be easily implemented in a lightweight, low-overhead fashion). Note, however, that ProbeGuard currently covers support for all sets of fundamental primitives and many new primitives may ultimately resort to using these existing ones to mount end-to-end attacks. For example, our current prototype cannot detect thread spraying primitives [25] (although we can extend it to do so). However, an end-to-end thread spraying attack still requires an arbitrary memory read/write probing primitive, which ProbeGuard can detect and hot-patch.

Second, an attacker may try to locate primitives in as many functions as possible, not necessarily to reveal the hidden region, but to intentionally slow down a victim application. While this is theoretically possible, we expect the number of primitives (usable primitives in distinct functions) in real-world applications to be sufficiently limited to deter such attacks. Similarly, one can mount surface expansion attacks, for example if the attacker learns that one of our reactive hardening techniques has an implementation bug she could lure ProbeGuard to hot-patch some function that injects a previously non-existent vulnerability in the application. More generally, an attacker could target implementation bugs in the baseline defense or our infrastructure to bypass ProbeGuard. While we cannot discount the possibility of such bugs in baseline defenses, ProbeGuard itself has a relatively small trusted computing base (TCB) of around 5,000 SLOC to minimize the attack surface.

Finally, an attacker may circumvent the code reuse defense with-out derandomizing and revealing hidden sensitive data. For example, using arbitrary read/write primitives, an attacker could conservatively walk through memory without touching unmapped memory and avoid detection. Even though this restricts such probes to regular non-hidden memory regions of the application, an attacker may choose to exploit memory disclosures to target defenses against JIT ROP [46] attacks for example, that build and rely on leakage resilience [10, 12, 15, 17]. We focus on hardening arbitrary code reuse defenses against information hiding attacks which have shown to trivially bypass even advanced defenses. We make no attempt to address other design weaknesses of such defenses, such as leakage-resistant randomization being vulnerable to sophisticated data-driven attacks [43].

Effectiveness

We tested our prototype's effectiveness in stopping all existing probing-based exploits against information hiding, viz., Blind ROP (BROP) [13], remote arbitrary memory read/write primitives [44], server-side Crash-Resistant Oriented Programming (CROP) [31], and allocation oracles [41].

To evaluate ProbeGuard's effectiveness in stopping BROP (arbitrary jump) probing attacks, we downloaded and ran the BROP exploit [2]. It repetitively uses a stack-based buffer overflow in the function ngx_http_parse_chunked in nginx 1.4.0 (CVE-2013-2028) to corrupt the return address and divert control flow upon function return to probe its address space based on crash or no-crash signals. Without ProbeGuard, the exploit ran successfully. With ProbeGuard, the exploit no longer succeeded: at the first (failed) jump-based probing attempt, ProbeGuard detected the event and reactively hardened (only) the offending function with a shadow stack. All subsequent control-flow diversion attempts through this function invariably resulted in crashes, thwarting the probing primitive.

To evaluate whether ProbeGuard can stop CROP (kernel memory read/write) probing attacks, we used such an attack described by Kollenda et al. [31]. Locating the next client connection via ngx_cycle->free_connections before sending a partial HTTP GET request, the attacker exploits a kernel memory write primitive to probe a chosen memory region by controlling the connection buffer (ngx_buf_t) parameters. If the chosen region is neither mapped nor writable memory, the recv( ) system call returns an EFAULT, forcing the server to close the connection. Otherwise, if the chosen memory was writable, the server successfully returns the requested page. Without ProbeGuard, the attack completed successfully. With ProbeGuard, our glibc EFAULT interceptors detected an anomalous event, reactively hardening (only) the offending function with SFI. The latter indiscriminately prevented all the subsequent kernel memory write attempts through this function, thwarting this probing primitive.

To evaluate ProbeGuard against allocation oracles attacks, we downloaded and ran the publicly available exploit [5] on Nginx 1.9.6 (the version on which the attack was originally tested). With-out ProbeGuard, the exploit successfully derandomized the address space, revealing the sensitive memory region. With ProbeGuard, even the first probe failed as our interceptors in glibc enforced allocation size thresholds and triggered reactive hardening.

To evaluate ProbeGuard's effectiveness in stopping arbitrary memory read/write-based probing primitives, we reproduced a stack-based buffer overflow vulnerability in the sreplace( ) function in proftpd 1.3.0 (CVE-2006-5815), using the publicly available exploit [1]. By controlling the arguments on the stack, an attacker can use a call to sstrncpy( ) to write to arbitrary memory locations [27]. Without ProbeGuard, the attack can probe the address space for mapped (writable) memory regions and locate a sensitive target. With ProbeGuard, the first such write to an unmapped memory area triggered reactive hardening of the offending function with SFI. This indiscriminately prevented all the subsequent arbitrary memory write attempts, thwarting this probing primitive.

Figure 8A:
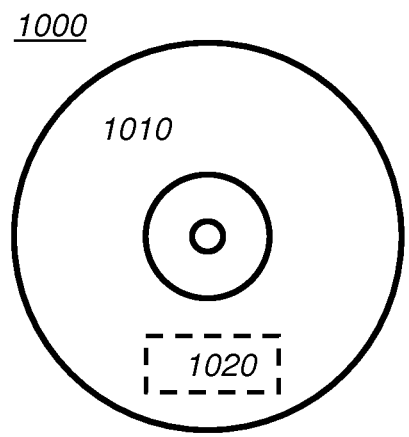

FIG. 8a shows a computer readable medium 1000 having a writable part 1010 comprising a computer program 1020, the computer program 1020 comprising instructions for causing a processor system to perform a computing and/or compiling method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said computing and/or compiling method.

Figure 8B:
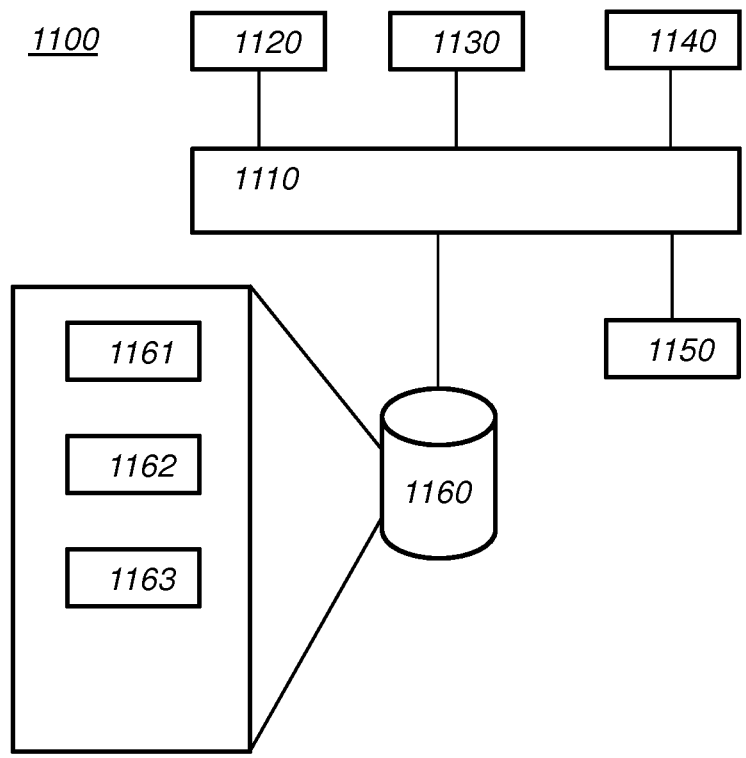

FIG. 8b illustrates an exemplary hardware diagram 1100 for implementing a device according to an embodiment. As shown, the device 1100 includes a processor 1120, memory 1130, user interface 1140, communication interface 1150, and storage 1160 interconnected via one or more system buses 1110. It will be understood that this figure constitutes, in some respects, an abstraction and that the actual organization of the components of the device 1100 may be more complex than illustrated.

The processor 1120 may be any hardware device capable of executing instructions stored in memory 1130 or storage 1160 or otherwise processing data. As such, the processor may include a microprocessor, field programmable gate array (FPGA), application-specific integrated circuit (ASIC), or other similar devices. For example, the processor may be an Intel Core i7 processor, ARM Cortex-R8, etc. In an embodiment, the processor may be ARM Cortex M0.

The memory 1130 may include various memories such as, for example L1, L2, or L3 cache or system memory. As such, the memory 1130 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 1140 may include one or more devices for enabling communication with a user such as an administrator. For example, the user interface 1140 may include a display, a mouse, and a keyboard for receiving user commands. In some embodiments, the user interface 1140 may include a command line interface or graphical user interface that may be presented to a remote terminal via the communication interface 1150.

The communication interface 1150 may include one or more devices for enabling communication with other hardware devices. For example, the communication interface 1150 may include a network interface card (NIC) configured to communicate according to the Ethernet protocol. For example, the communication interface 1150 may comprise an antenna, connectors or both, and the like. Additionally, the communication interface 1150 may implement a TCP/IP stack for communication according to the TCP/IP protocols. Various alternative or additional hardware or configurations for the communication interface 1150 will be apparent.

The storage 1160 may include one or more machine-readable storage media such as read-only memory (ROM), random-access memory (RAM), magnetic disk storage media, optical storage media, flash-memory devices, or similar storage media. In various embodiments, the storage 1160 may store instructions for execution by the processor 1120 or data upon with the processor 1120 may operate. For example, the storage 1160 may store a base operating system 1161 for controlling various basic operations of the hardware 1100. For example, the storage may store instructions 1162 for detecting an address probing, locating the computer program code part from which the address probing originated, and selectively replacing said originating computer program code part with a replacement computer program code part. For example, the storage may store instructions 1163 for compiling a computer program with and without address probing countermeasure, and including detecting and replacing code in the computer program code.

It will be apparent that various information described as stored in the storage 1160 may be additionally or alternatively stored in the memory 1130. In this respect, the memory 1130 may also be considered to constitute a "storage device" and the storage 1160 may be considered a "memory." Various other arrangements will be apparent. Further, the memory 1130 and storage 1160 may both be considered to be "non-transitory machine-readable media." As used herein, the term "non-transitory" will be understood to exclude transitory signals but to include all forms of storage, including both volatile and non-volatile memories.

While device 1100 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1100 is implemented in a cloud computing system, the various hardware components may belong to separate physical systems. For example, the processor 1120 may include a first processor in a first server and a second processor in a second server.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims, references in parentheses refer to reference signs in drawings of exemplifying embodiments or to formulas of embodiments, thus increasing the intelligibility of the claim. These references shall not be construed as limiting the claim.

The invention claimed is:

1. A computing device configured for execution of a computer program comprising:
a memory circuit,
wherein the memory circuit is arranged to store computer program code and computer program data,
wherein the computer program code comprises multiple computer program code parts,
wherein each of the multiple computer program code parts is configured to perform a particular function,
wherein the computer program code comprises one or more predefined replacement computer code parts corresponding to one or more of the multiple computer program code parts,
wherein each of the one or more replacement computer code parts performs the particular function of the corresponding one or more of the multiple computer code parts,
wherein each of the one or more replacement code parts comprises address probing countermeasures that are not included in the corresponding one or more multiple computer code parts,
wherein the computer program code is configured to operate upon the computer program data,
wherein addresses of the computer program code and/or computer program data are randomized in an address space; and
a processor circuit,
wherein the processor circuit is configured to execute the computer program code,
wherein the processor circuit is configured to monitor the execution of the computer program code by running at least one anomaly detector,
wherein the anomaly detector is configured to detect an address probing on the computer program,
wherein the processor circuit is configured to locate a probed computer program code part from which the address probing originated,
wherein the processor circuit is configured to replace the the probed computer program code part with the replacement computer program code part corresponding to the probed computer program code part.

2. The computing device as in claim 1, wherein the anomaly detector is a portion of the computer program code.

3. The computing device as in claim 1, wherein the anomaly detector is configured for one or more of the following:
detecting a read or write operation to an invalid address;
intercepting a system call and inspecting a return value of the intercepted system call for one or more errors;
detecting attempted execution from a first portion of the memory circuit, wherein the first portion of the memory circuit is non-executable portion;
detecting attempted execution of an illegal instruction;
intercepting a system call arranged to allocate an allocated portion of the memory circuit, inspecting a size of the allocation portion, and determining if the size is above a threshold.

4. The computing device as in claim 1, wherein the multiple computer program code parts correspond to basic blocks and/or functions.

5. The computing device as in claim 1, wherein locating the probed computer program code part comprises:
retrieving a trace of the computer program execution, wherein the trace comprises addresses in the address space;
determining the most recent address in the trace; and
determining the probed computer program code part corresponding to the most recent address.

6. The computing device as in claim 5, wherein the most recent address in the trace is the most recent address that is not in a system library code or kernel code.

7. The computing device as in claim 1, wherein selectively replacing the probed computer program code part comprises hot patching the computer program code.

8. The computing device as in claim 1,
wherein each replacement computer program code part is unexecuted until the replacement computer program code part replaces the probed computer program code part.

9. The computing device as in claim 1,
wherein the processor circuit is configured to add the address probing countermeasure to at least one source code part,
wherein the source code part corresponds to at least one of the multiple computer program code parts,
wherein the processor circuit is configured to compile the source code part with address probing countermeasure after detecting the address probing,
wherein the compiled source code part becomes the replacement computer program code part.

10. The computing device as in claim 1,
wherein the computer program code comprises switchboard data,
wherein the processor circuit is arranged to replace the probed computer program code part with the replacement computer program code part by switching execution of the probed computer program code part to execution of the replacement computer program code part,
wherein the processor circuit controls the switch to the replacement computer program code based on the switchboard data.

11. The computing device as in claim 9, wherein the address probing countermeasure is configured for one or more of the following:
verifying memory circuit load and store operations in the replacement computer program code;
preventing control-flow diversion in the replacement computer program code;
verifying return addresses on the stack before diverting control flow in the replacement computer program code;
isolating faults in the replacement computer program code; and
limiting memory circuit allocation operations in the replacement computer program code.

12. The computing device as in claim 9, wherein the added countermeasure is configured to produce a computer program crash or restart for an illegitimate memory circuit access to a mapped memory circuit area and to an unmapped memory circuit area.

13. The computing device as in claim 1,
wherein the computer program code comprises recovery code,
wherein the processor circuit is configured to divert control flow to the recovery code after the replacement to resume operation of the computer program.

14. The computing device as in claim 1,
wherein multiple replacement code parts are arranged to replace at least one of the multiple computer program code parts,
wherein the multiple replacement code parts comprise different address probing countermeasures,
wherein at least one of the replacement code parts is selected from the multiple replacement code parts in dependence upon a type of address probing detected by the anomaly detector.

15. The computing device as in claim 1,
wherein the anomaly detector comprises a static library linked with the computer program,
wherein the static library comprises a signal handler configured to register at start-up of the computer program.

16. A compiler device comprising:
a communication interface, wherein the communication interface is configured to receive a source code; and
a processor circuit,
wherein the processor circuit is configured to compile the source code to obtain computer program code,
wherein the computer program code comprises multiple computer program code parts corresponding to multiple source code parts,
wherein each of the multiple computer program code parts are configured to perform a particular function,
wherein the computer program code comprises one or more predefined replacement computer code parts corresponding to one or more of the multiple computer program code parts,
wherein each of the one or more replacement computer code parts performs the particular function of the corresponding one or more of the multiple computer code parts,
wherein each of the one or more replacement code parts comprises address probing countermeasures that are not included in the corresponding one or more multiple computer code parts,
wherein the computer program code is arranged to execute in a randomized address space,
wherein the processor circuit is configured to include in the computer program code at least one anomaly detector,
wherein the at least one anomaly detector is configured to detect an address probing on the computer program during execution,
wherein the processor circuit is configured to include switching code in the computer program code,
wherein the switching code is configured to:
locate a probed computer program code part from which the address probing originated upon detecting the address probing; and
replace the probed computer program code part with the replacement computer program code part corresponding to the probed computer program code part.

17. The A computing method comprising:
storing a computer program code and computer program data,
wherein the computer program code comprises multiple computer program code parts,
wherein each of the multiple computer program code parts is configured to perform a particular function,
wherein the computer program code comprises one or more predefined replacement computer code parts corresponding to one or more of the multiple computer program code parts,
wherein each of the one or more replacement computer code parts performs the particular function of the corresponding one or more of the multiple computer code parts,
wherein each of the one or more replacement code parts comprises address probing countermeasures that are not included in the corresponding one or more multiple computer code parts,
wherein the computer program code is configured to operate upon the computer program data,
wherein addresses of the computer program code and/or computer program data are randomized in an address space;
executing the computer program code;
monitoring the execution of the computer program code by running at least one anomaly detector,
wherein the anomaly detector is configured to detect an address probing on the computer program;
locating a probed computer program code part from which the address probing originated upon detecting the address probing; and
replacing the probed computer program code part with the replacement computer program code corresponding to the probed computer program code party.

18. The A compiling method for compiling a source code comprising
compiling the source code to obtain computer program code,
wherein the computer program code comprises multiple computer program code parts corresponding to multiple source code parts,
wherein each of the multiple computer program code parts is configured to perform a particular function,
wherein the computer program code comprises one or more predefined replacement computer code parts corresponding to one or more of the multiple computer program code parts,
wherein each of the one or more replacement computer code parts performs the particular function of the corresponding one or more of the multiple computer code parts,
wherein each of the one or more replacement code parts comprises address probing countermeasures that are not included in the corresponding one or more multiple computer code parts,
wherein the computer program code is arranged to execute in a randomized address space;
including in the computer program code at least one anomaly detector,
wherein the anomaly detector is arranged to detect an address probing on the computer program; and
including switching code in the computer program code, wherein the switching code is configured to:
upon detecting address probing, locate a probed computer program code part from which the address probing originated; and
selectively replace the probed computer program code part with the replacement computer program code part corresponding to the probed computer program code part.

19. A computer program stored on a non-transitory medium, wherein the computer program when executed on a processor performs the method as claimed in claim 17.

20. A computer program stored on a non-transitory medium, wherein the computer program when executed on a processor performs the method as claimed in claim 18.

* * * * *